United States Patent [19]
Chen et al.

[11] Patent Number: 5,745,600
[45] Date of Patent: *Apr. 28, 1998

[54] WORD SPOTTING IN BITMAP IMAGES USING TEXT LINE BOUNDING BOXES AND HIDDEN MARKOV MODELS

[75] Inventors: Francine R. Chen, Menlo Park; Lynn D. Wilcox, Portola Valley; Dan S. Bloomberg, Palo Alto, all of Calif.

[73] Assignee: Xerox Corporation, Stamford, Conn.

[*] Notice: The term of this patent shall not extend beyond the expiration date of Pat. No. 5,438,630.

[21] Appl. No.: 336,727

[22] Filed: Nov. 9, 1994

Related U.S. Application Data

[63] Continuation of Ser. No. 992,358, Dec. 17, 1992, abandoned.

[51] Int. Cl.$^6$ .................................................... G06K 9/68
[52] U.S. Cl. .................................... 382/218; 382/228
[58] Field of Search ............................. 382/195, 196, 382/173, 174, 204, 254, 256–258, 155, 224, 226

[56] References Cited

U.S. PATENT DOCUMENTS

| | | | |
|---|---|---|---|
| 4,155,072 | 5/1979 | Kawa | 382/20 |
| 4,754,489 | 6/1988 | Bokser | 382/14 |
| 5,048,109 | 9/1991 | Bloomberg et al. | 382/50 |
| 5,065,437 | 11/1991 | Bloomberg | 382/55 |
| 5,081,690 | 1/1992 | Tan | 382/50 |
| 5,151,951 | 9/1992 | Ueda et al. | 382/19 |
| 5,199,077 | 3/1993 | Wilcox et al. | 381/43 |
| 5,201,011 | 4/1993 | Bloomberg et al. | 382/9 |
| 5,237,627 | 8/1993 | Johnson et al. | 382/30 |
| 5,321,770 | 6/1994 | Huttenlocher | 382/22 |
| 5,325,444 | 6/1994 | Cass et al. | 382/9 |
| 5,438,630 | 8/1995 | Chen et al. | 382/159 |

OTHER PUBLICATIONS

Computer Vision, Graphics and Image Processing, vol. 35, 1986, pp. 111–127, T. Pavlidis "A vectorizer and feature extractor for document recognition" p. 112, line 9–14; Figure 1.

ICASSP–92 IEEE Int. Conf. on Acoustics, Speech and Signal Processing, vol. 2, 23 Mar. 1992, San Francisco, CA, pp. 97–100, XP356946, L.D. Wilcox et M A Bush "Training and search algorithms for an interactive wordspotting system"; Figure 1.

(List continued on next page.)

*Primary Examiner*—Joseph Mancuso
*Assistant Examiner*—Gerard Del Rosso
*Attorney, Agent, or Firm*—Townsend and Townsend and Crew LLP

[57] ABSTRACT

Font-independent spotting of user-defined keywords in a scanned image. Word identification is based on features of the entire word without the need for segmentation or OCR, and without the need to recognize non-keywords. Font-independent character models are created using hidden Markov models (HMMS) and arbitrary keyword models are built from the character HMM components. Word or text line bounding boxes are extracted from the image, a set of features based on the word shape, (and preferably also the word internal structure) within each bounding box is extracted, this set of features is applied to a network that includes one or more keyword HMMs, and a determination is made. The identification of word bounding boxes for potential keywords includes the steps of reducing the image (say by 2x) and subjecting the reduced image to vertical and horizontal morphological closing operations. The bounding boxes of connected components in the resulting image are then used to hypothesize word or text line bounding boxes, and the original bitmaps within the boxes are used to hypothesize words. In a particular embodiment, a range of structuring elements is used for the closing operations to accommodate the variation of inter- and intra-character spacing with font and font size.

46 Claims, 16 Drawing Sheets

OTHER PUBLICATIONS

IBM Journal of Research and Development, vol. 26, No. 6, Nov. 1982, New York, NY, pp. 681–686, N.F. Brickman, "Word AutoCorrelation redundancy match (WARM) technology" Section 2. System overview; Figure 2.

IEEE Trans. on Acoustics, Speech and Signal Processing, vol. 38, No. 11, Nov. 1990, pp. 1870–1878, J. G. Wilpon, et al., "Automatic recognition of keywords in uncontrained speech using hidden markov models", p. 1871, right column, line 18 — line 46; Figure 3.

Systems & Computers in Japan, vol. 21, No. 4, 1990, New York, NY, pp. 26–35, XP159200, T. Nakano, et al., "A new recognition method for stamped and painted alphanumerals" Section 2.1 Principle; Figures 3–7.

Dan S. Bloomberg, "Multiresolution Morphological Approach to Document Image Analysis", *Proceedings of the Int. Conf. on Document Analysis and Recognition*, Saint-Malo, France, Sep. 1991, pp. 963–971.

Simon Kahan et al.,"On the Recognition of Printed Characters of Any Font and Size", *IEEE Transations on Pattern Analysis and Machine Intelligence*, vol. PAMI-9, No. 2, Mar. 1987, pp. 274–288.

Chinmoy B. Bose et al., Connected and Degraded Text Recognition Using Hidden Markov Model, *Proceedings of the Int. Conf. on Pattern Recognition*, Netherlands, Sep. 1992, pp. 116–119.

Tin Kam Ho et al., "A Word Shape Analysis Approach to Recognition of Degraded Word Images", *Proceedings of the USPS Advanced Technology Conference*, Nov. 1990, pp. 217–231.

Yang He et al., "Handwritten Word Recognition Using HMM with Adaptive Length Viterbi Algorithm", *Proceedings of the Int. Conf. on Acoustics, Speech and Signal Processing*, San Francisco, California, Mar. 1992, vol. 3, pp. 153–156.

Douglas B. Paul et al., "Speaker Stress–Resistant Continuous Speech Recognition", *Proceedings of the Int. Conf. on Acoustics, Speech and Signal Processing*, 1988, pp. 283–286.

Lawrence R. Rabiner, A Tutorial on Hidden Markov Models and Selected Applications in Speech Recognition, *Proceedings of the IEEE*, vol. 77, No. 2, Feb. 1989, pp. 257–285.

Lawrence R. Rabiner et al., "An Introduction to Hidden Markov Model", *IEEE ASSP Magazine*, Jan. 1986, pp. 4–16.

WORD SPOTTING IN BITMAP IMAGES USING TEXT LINE BOUNDING BOXES AND HIDDEN MARKOV MODELS

This is a continuation of application Ser. No. 07/992,358 filed Dec. 17, 1992, now abandoned.

CROSS REFERENCE TO RELATED APPLICATIONS

The following four applications, including this one, are filed concurrently and the other three are incorporated by reference into this application:

WORD SPOTTING IN SCANNED IMAGES USING WORD BOUNDING BOXES AND HIDDEN MARKOV MODELS, Chen et al., Attorney Docket 13188-51, Xerox Docket D/92388;

WORD SPOTTING IN SCANNED IMAGES USING TEXT LINE BOUNDING BOXES AND HIDDEN MARKOV MODELS, Chen et al., Attorney Docket 13188-54, Xerox Docket D/92388Q1;

WORD SPOTTING IN SCANNED IMAGES USING CONTEXT-SENSITIVE CHARACTER MODELS WITHOUT BASELINES, Wilcox et al., Attorney Docket 13188-55, Xerox Docket D/92388Q2; and TECHNIQUE FOR GENERATING BOUNDING BOXES FOR WORD SPOTTING IN SCANNED IMAGES, Bloomberg et al., Attorney Docket 13188-56, Xerox Docket D/92388Q3.

COPYRIGHT NOTIFICATION

A portion of the disclosure of this patent document contains material which is subject to copyright protection.

The copyright owners have no objection to the facsimile reproduction, by anyone, of the patent document or the patent disclosure, as it appears in the patent and trademark office patent file or records, but otherwise reserve all copyright rights whatsoever.

SOFTWARE APPENDIX

Appendix 1 having a total of 143 pages, including a cover sheet, is included as part of this application.

BACKGROUND OF THE INVENTION

The present invention relates generally to text recognition and more specifically to a technique for recognizing character strings (keywords) without having to detect or identify the individual characters making up the strings.

Text of electronically encoded documents tends to be found in either of two distinct formats, namely bitmap format and character code format. In the former, the text is defined in terms of an array of pixels corresponding to the visual appearance of the page. A binary image is one where a given pixel is either ON (typically black) or OFF (typically white). A pixel can be represented by one bit in a larger data structure. A grayscale image is one where each pixel can assume one of a number of shades of gray ranging from white to black. An N-bit pixel can represent $2^N$ shades of gray. In a bitmap image, every pixel on the image has equal significance, and virtually any type of image (text, line graphics, and pictorial) can be represented this way. In character code format, the text is represented as a string of character codes, the most common being the ASCII codes. A character is typically represented by 8 bits.

There are many applications where a document must be converted from bitmap format to character code format. For example, a body of text may be available only in a printed version, and be required to be input to a word processing program for editing. The choice is typically between manually inputting the text, character by character at a keyboard, or scanning the document, and using optical character recognition (OCR) techniques to convert the bitmap image into a character code file. Proofing of the resultant document is usually required.

OCR is a well-developed and continually developing technology, but has inherent weaknesses. When the electronic document has been derived by scanning a paper document, there is an inevitable loss. If the scanned image is a second- or third-generation photocopy, the problem is exacerbated. A particular problem in this regard is the tendency of characters in text to blur or merge. Since OCR is based on the assumption that a character is an independent set of connected pixels, character identification fails when characters have merged.

The OCR process carries a significant cost in terms of time and processing effort, since each bitmap of a character must be distinguished from its neighbors, its appearance analyzed, and a decision made identifying it as a distinct character in a predetermined set of characters.

There are a number of applications, however, that require only the identification of whole words rather than individual characters. It has been shown that identification of whole words is more robust for degraded images containing broken and touching characters (See Ho, Hull, and Srihari). One system, based on hidden Markov models (HMMs), represents words as a concatenation of single-state character HMMs (See He, Chen, and Kundu). This system requires segmentation of the characters prior to feature extraction. Another system uses multiple-state HMMs to model characters without requiring segmentation of words into characters (See Bose and Kuo). However, segmentation of words into sub-character segments based on stroke and arc analysis is required prior to feature extraction. In both these HMM-based systems, segmentation can introduce errors at an early stage in processing.

SUMMARY OF THE INVENTION

The present invention provides font-independent spotting of user-defined keywords in a bitmap image. Word identification is based on features of the entire word without the need for segmentation into characters or sub-character segments such as strokes and arcs. The invention further avoids the need to recognize characters in non-keywords.

In brief, the invention includes creating font-independent character models using hidden Markov models (HMMs) and building arbitrary keyword models from the character HMM components. A method according to the present invention includes the steps of constructing bounding boxes of text lines potentially containing the keyword from the image, generating a set of features based on word shapes (and preferably also the internal structure of words) within each text line bounding box, applying this set of features to a network that includes one or more keyword HMMS, and determining whether the particular text line contains the keyword sought.

According to one aspect of the invention, the construction of text line bounding boxes for potential text lines includes the steps of reducing the image (say by 2×) and subjecting the reduced image to vertical and horizontal morphological closing operations. The bounding boxes of connected components in the resulting image are then used to hypothesize text line bounding boxes, and the original bitmaps within the boxes are used to hypothesize words in the text line. In a particular embodiment, a range of structuring elements is used for the closing operations to accommodate the variation of inter- and intra-character spacing with font and font size.

According to a further aspect of the invention, the image of the hypothesized text line in each bounding box is scaled to a standard height. This is preferably performed by clipping the image in each bounding box to remove non-character white space around at least the top, left, and bottom edges, resampling the image to a standard height, and resampling the image width proportionally.

According to a further aspect of the invention, the feature generation provides both the contours and the internal structure of words within the text line. The image of the text line is characterized by a sequence of feature vectors taken at various locations along the horizontal axis. In specific embodiments, the feature vector at a given horizontal location includes the vertical positions (relative to the top and bottom of the renormalized bounding box) of the upper and lower contours of the word image at the horizontal location, and information regarding the word internal structure between the upper and lower contours. In one embodiment, this internal structure information includes a number of auto-correlation values at various lags of the vertical slice of the text line image at the horizontal position. In another embodiment, the internal structure information includes the number of pixel transitions between the upper and lower contours.

According to a further aspect of the invention, the keyword spotting network for one or more keywords comprises corresponding keyword HMMs, each of which is a concatenation of appropriate context-dependent character HMMs. Each character as at most four contexts, depending on whether the character as an ascender or descender and whether it is in a text line with other characters that have ascenders and descenders. Depending on the character and the context, the character may be located adjacent the bottom of the bounding box with white space above, adjacent the top of the bounding box with white space below, centrally located within the bounding box with white space above and below, or may extend the entire height of the bounding box. If the keyword search is not intended to be case-sensitive, additional keyword HMMs for relevant case combinations (e.g., lead-uppercase and all-uppercase) are provided.

According to a further aspect of the invention, the character HMMs are characterized by a character-dependent number of states plus an optional space state, where each state is described by a probability distribution of the feature vectors that characterize a distinct portion of that character.

According to a further aspect of the invention, the spotting network also contains a non-keyword HMM. The use of a non-keyword HMM in the spotting network makes the spotting robust in view of possible image degradation. Without such a non-keyword HMM, the score is dependent on image and font quality and it is difficult to set a score threshold. With the non-keyword HMM, it is possible to evaluate the keyword score relative to non-keyword score, with the relationship remaining in spite of poor image quality.

A further understanding of the nature and advantages of the present invention may be realized by reference to the remaining portions of the specification and the drawings.

BRIEF DESCRIPTION OF THE DRAWINGS

FIGS. 20A–20D show a representative input image, as boxed using various sized structuring elements for word boxing; and FIGS. 21A and 21B show a representative image, as boxed using various sized structuring elements for text line boxing.

DESCRIPTION OF SPECIFIC EMBODIMENTS

Definitions and Terminology Related to Morphology

Figure 1:
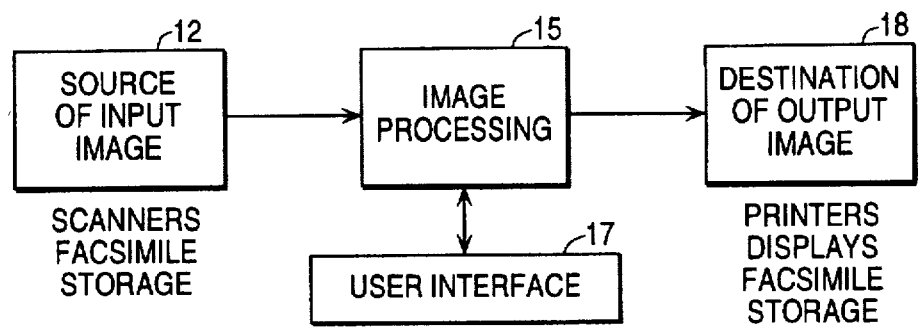
FIG. 1 is a block diagram of a computer system within which the present invention may be embodied.

The present discussion deals primarily with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image. The image at a given stage in the processing will sometimes be referred to as the current image. Where certain processing steps are optional, the current image may be the input image. The image that results from an explicitly recited operation will sometimes be referred to as the resultant image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

AND, OR, and XOR are logical operations carried out between two images on a pixel-by-pixel basis.

NOT is a logical operation carried out on a single image on a pixel-by-pixel basis.

"Reduction" is a scale operation characterized by a SCALE factor N and a threshold level T. Reduction with SCALE=N entails dividing the source image into NxN squares of pixels, mapping each such square in the source image to a single pixel on the destination image. The value for the pixel in the destination image is determined by the threshold level T, which is a number between 1 and $N^2$. If the number of ON pixels in the pixel square is greater or equal to T, the destination pixel is ON, otherwise it is OFF.

A "4-connected region" (or "4-connected component") is a set of ON pixels wherein any two pixels in the set can be joined by a path that includes the two pixels and includes only pixels in the set, and each pixel on the path is horizontally or vertically adjacent to at least one other pixel on the path. An isolated ON pixel that has no 4-connected neighbors may as a matter of definition be considered a 4-connected region.

An "8-connected region" (or "8-connected component") is a set of ON pixels wherein any two pixels in the set can be joined by a path that includes the two pixels and includes only pixels in the set, and each pixel on the path is horizontally, vertically, or diagonally adjacent to at least one other pixel on the path. An ON pixel that has no 8-connected neighbors may as a matter of definition be considered an 8-connected region.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

For opening and closing, the result does not depend on the center location of the SE since each operation includes successive complementary operations with the same SE.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

System Overview

FIG. 1 is a block diagram of a generalized image processing system 10 within which the present invention may be embodied. The system configuration illustrated at this high level is standard, and as such, FIG. 1 is labelled "Prior Art." However, a system such as system 10, suitably programmed to embody the present invention, is not prior art.

Generally, an input image is provided from a source device 12, which might be a scanner, facsimile machine, or storage device. The input image is forwarded to an image processing device 15, which may be any well-known device such as a general-purpose computer, configured according to the present invention. In response to commands at a user interface 17, image processing device 15 produces an output image at a destination device 18, which may be a printer, display, facsimile machine, or other storage device. In some instances it may not be necessary to actually provide an output image. Rather, information regarding the input image may be all that is required.

Figure 2A:
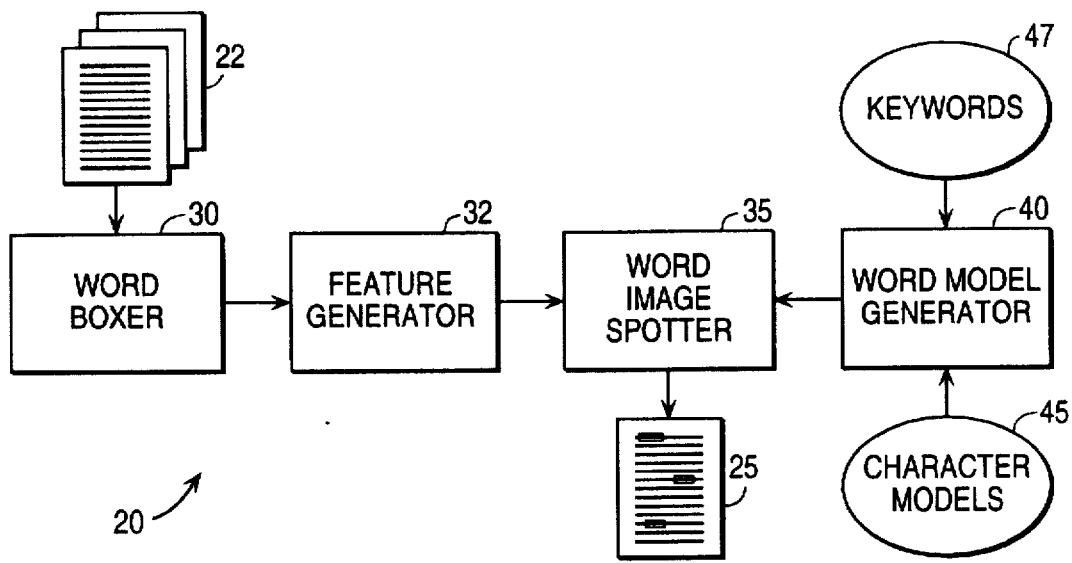
FIG. 2A is a high-level flow diagram of a first method for spotting keywords in an input image.

FIG. 2A is a flow diagram of a keyword spotting system 20 that uses word bounding boxes. Some typical applications provide information filtering, where text containing the keywords is identified and selected for further processing. FIG. 2A shows the particular application wherein a multipage input document 22 (in image form) containing text is processed to produce an output document 25 (in image form) containing only those pages having the keywords, with the keywords highlighted.

The input image is operated on by a word boxer 30, which identifies word bounding boxes for all potential keywords in the image. The image of the potential key word in each bounding box is operated on by a feature generator 32, which analyzes the word structure and generates feature vectors at uniformly spaced horizontal locations to categorize the potential keyword. The set of potential keywords is then applied to a word image spotter 35. The word image spotter is a network that receives word models. In the preferred embodiment, the word models include keyword models that are generated (step 40) by concatenating appropriate ones of a set 45 of character models, selected according to a set 47 of user-provided keywords. Word image spotter 35 preferably includes at least one non-keyword model in addition to the keyword models, and can also be provided with models of function words (prepositions, conjunctions, and articles).

Figure 2B:
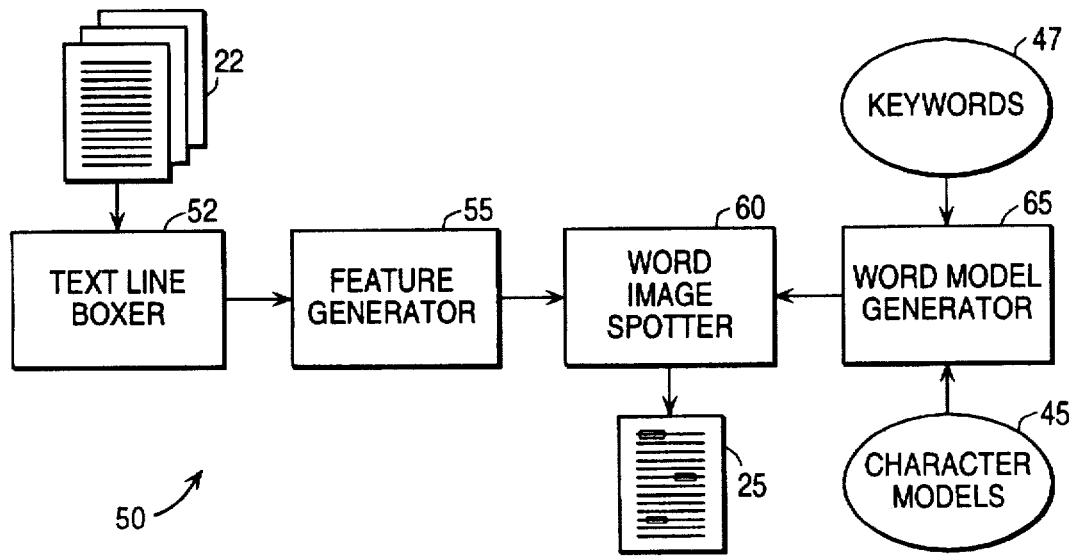
FIG. 2B is a high-level flow diagram of a second method for spotting keywords in an input image.

FIG. 2B is a flow diagram of a keyword spotting system 50 that uses text line bounding boxes. System 50 differs from system 20 in FIG. 2A in that it includes a text line boxer 52, a feature generator 55 that operates on text lines, and a word image spotter 60 and a word model generator 65 that take into account the fact that a keyword is part of a text line. The keyword entry and character model generation are typically the same as for system 20.

Word Boxer

Figure 3:
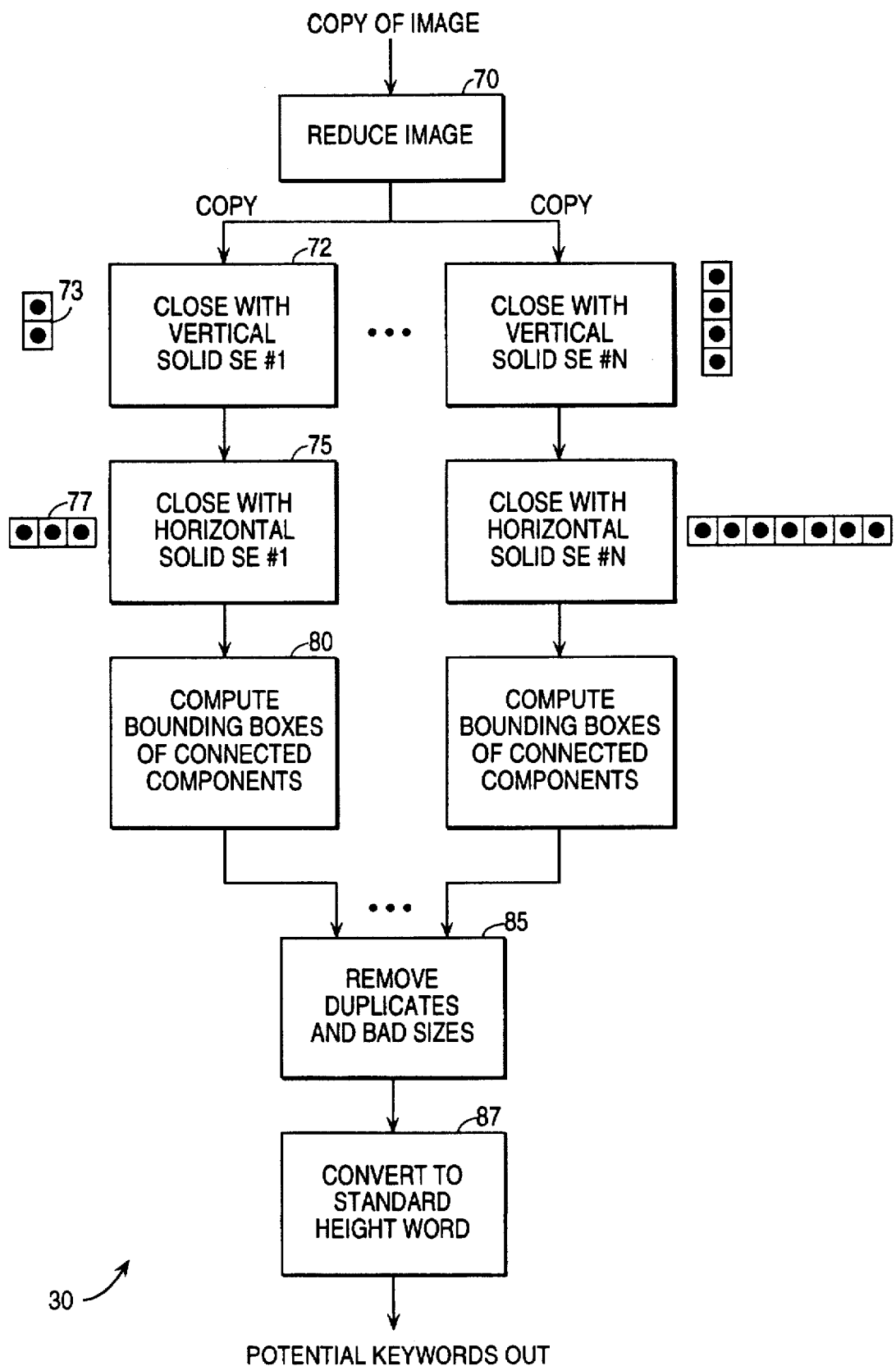
FIG. 3 is a flow diagram of a technique for determining word boxes.

FIG. 3 is a flow diagram showing the steps carried out by word boxer 30. A copy of the input image is reduced (step 70), preferably by a 2× thresholded reduction with a threshold of 1. A number of copies of the reduced image are then made and each copy is subjected to a morphological close operation (step 72) with a vertical solid structuring element (SE) 73 and a close operation (step 75) with a horizontal solid SE 77. Each copy is closed with a differently-sized SE pair to accommodate different size fonts and inter-character spaces. For example, a 1×4 horizontal SE is suitable for filling spaces three pixels wide in the reduced image, while a 1×6 horizontal SE is suitable for filling spaces five pixels wide. By way of example, the drawing shows one copy being subjected to a 2×1 vertical close and a 1×3 horizontal close, and another being subjected to a 4×1 vertical close and a 1×7 horizontal close. In a particular embodiment, nine copies are processed, with the following SE pairs: (2,3), (2,4), (3,5), (3,6), (4,7), (4,8), (5,9), (5,10), and (8,15), where (m,n) denotes a vertical m×1 close followed by a horizontal 1×n close. Other embodiments with different scanning resolutions may require other SE pairs.

Each copy of the image, thus closed, is subjected to processing for computing the bounding boxes of connected components (step 80). The purpose of the thresholded reduction and morphological closing is to cause the individual characters in words to merge together, while preserving the interword spacing. These connected components are likely to be potential keywords with their characters merged. It is noted that a horizontal close with a small SE will not cause characters in a single word in a large font to merge, while a horizontal close with a large SE will cause words as well as characters in a small font to merge. Accordingly, closing copies of the image with different sized SEs is one way to make sure that a word in a given font size will end up as a single connected component in at least one processed copy of the image.

The bounding boxes determined with the differently-sized pairs of SEs are merged, duplicates and near duplicates removed, and undersized or oversized components removed (step 85). In a particular embodiment, boxes in the reduced image are removed if they are smaller than 6×6 pixels or larger than 1000×128 pixels. The lower threshold tends to eliminate noise in the image, while the upper threshold tends to reject line graphics and halftone regions in the image. The bounding box information is then used in connection with the original image to provide a set of potential keywords, scaled to a standard height (step 87).

Figure 4:
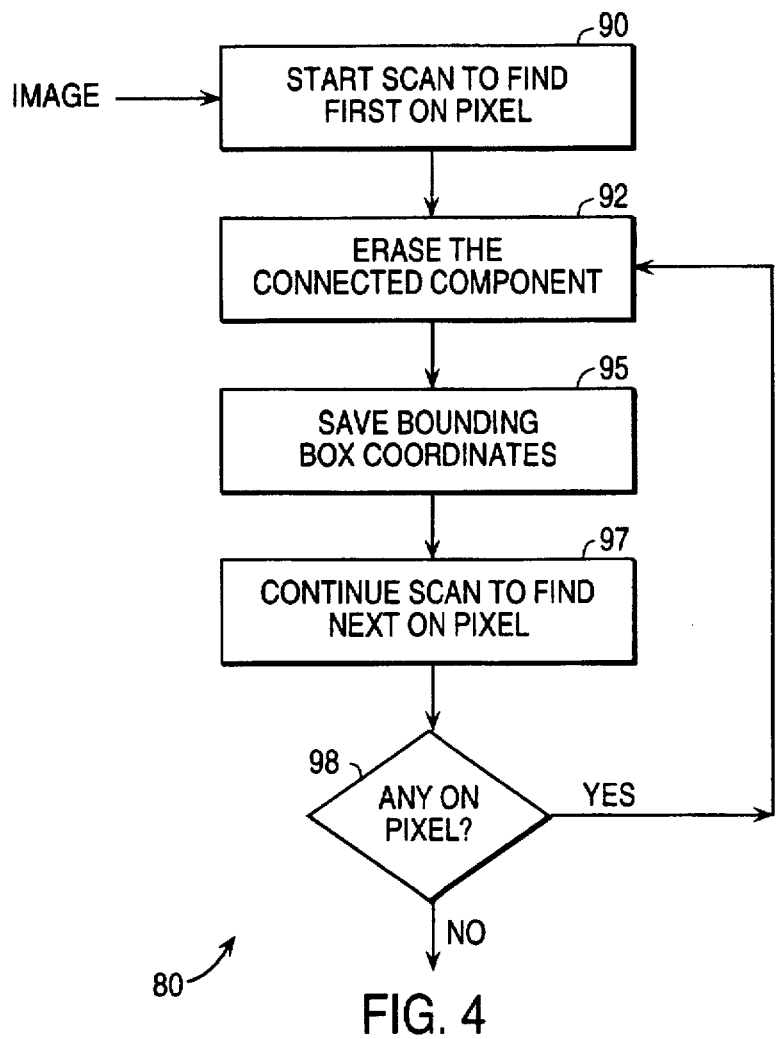
FIG. 4 is a flow diagram of a particular technique for determining bounding boxes of connected components.

FIG. 4 is a flow diagram of a technique for extracting coordinate information on connected components in the reduced image. While it is possible to perform the analysis using 8-connected components, 4-connected components are presently used. A copy of the reduced image is scanned by the computer (i.e., each pixel is evaluated), starting at the upper left and proceeding from left to right and top to bottom until an ON pixel is found (step 90). The coordinates of that pixel are saved, and initially represent the current best information regarding the corners of the bounding box of the connected component to which the found pixel belongs (the bounding box is fully specified by its upper left and lower right corners). The found pixel and all its 4-connected neighbors are turned OFF (step 92). As each pixel is turned OFF, its coordinates are compared with the current corner coordinates. If either coordinate is outside the range of the current bounding box, the appropriate corner coordinate(s) are updated to enlarge the now-current bounding box. The technique for finding and turning off the 4-connected neighbors is described in Paul S. Heckbert, "A Seed Fill Algorithm," pages 275–277 and 721–722 of "Graphics Gems," edited by Andrew S. Glassner (Academic Press, Inc. 1990).

Once a connected component has been erased and its bounding box coordinates saved (step 95), the scan begins again (step 97), starting immediately past the position where the first pixel in the just-erased component was found. If another ON pixel is found (test 98), the sequence starting at step 92 is repeated. Once the resumed scan fails to find an ON pixel, the procedure is complete, and the relevant bounding box information can be extracted.

Figure 5:
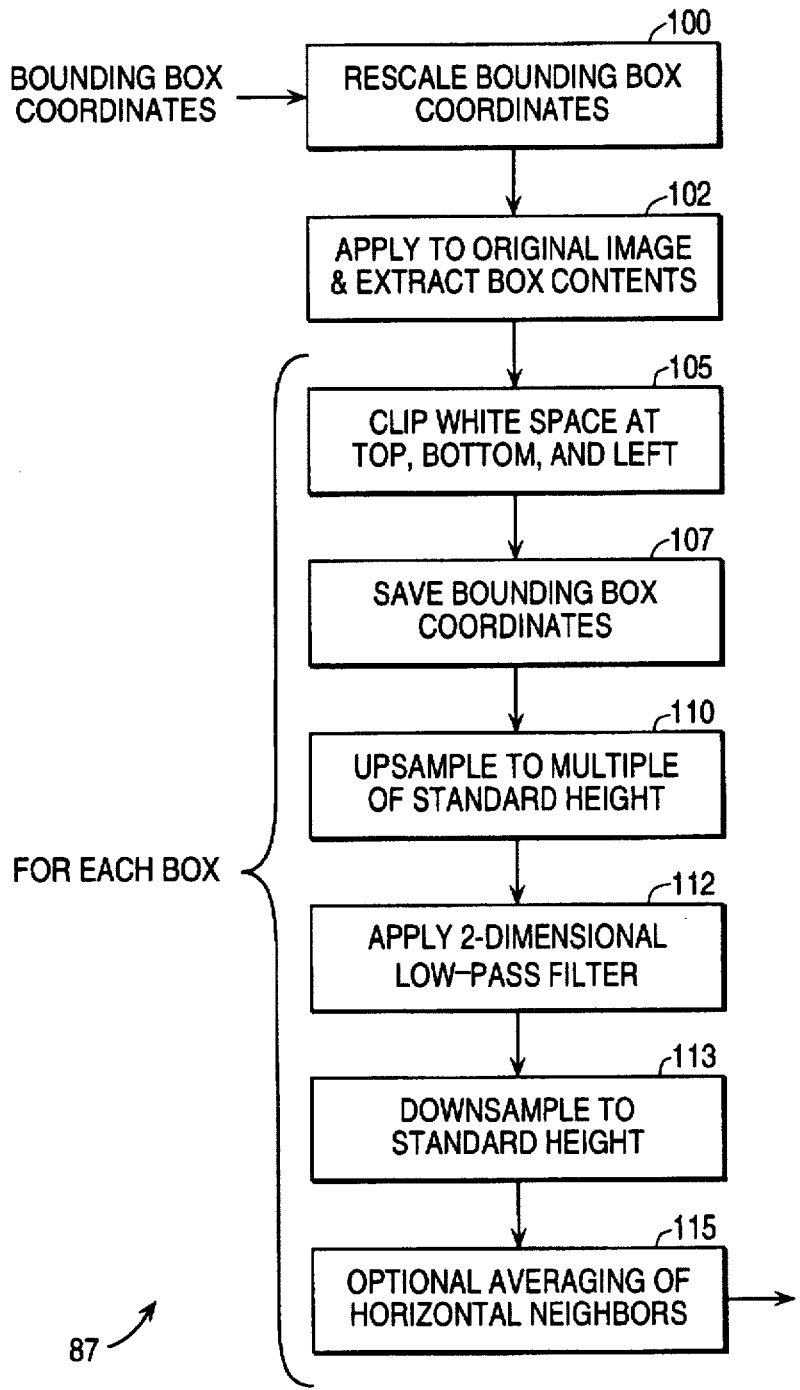
FIG. 5 is a flow diagram of a technique for normalizing the potential keywords in their bounding boxes.

FIG. 5 is a flow diagram of the substeps in step 87 of converting each potential word to a standard height word. The bounding box coordinates from step 85 are rescaled to bring them back to the size of the original image (step 100) and these coordinates are used to extract the bitmap contents of each box from the original image (step 102). Each box is clipped at the top, bottom, and left side to remove white space (step 105). Normally, the close operation carried out in the reduced image would not expand the connected components, but the connected components themselves might be slightly larger than the corresponding word due to the thresholded reduction. Thus, after clipping, the original bitmap content of each bounding box makes contact with the top, the bottom, and the left side of the bounding box.

Assuming that the content of the bounding box is a word, a portion of a word, or multiple words, the first letter will touch the left of the bounding box, the tallest letter will touch the top of the bounding box, and the letter with the lowest descender will touch the bottom of the bounding box. The bounding box coordinates are saved (step 107) so that if a keyword is ultimately found in that bounding box, appropriate action can be taken.

The bounding box and its contents are then normalized to a standard height in a multi-step procedure that includes upsampling to a multiple of the standard height (step 110), filtering (step 112), and downsampling to the standard height (step 113), with the resulting width being scaled proportionally during upsampling and downsampling. In a current embodiment, the standard height is 32 pixels, but a height of 16 pixels is also being considered.

The filtering step is a two-dimensional low pass filter to prevent aliasing introduced by resampling. At this point, what was previously a binary image is now a grayscale image (8 bits per pixel in a specific embodiment). For normalization to 32-pixel columns, a character typically contains 10–30 columns.

The image is optionally subjected to an averaging step 115 wherein each pixel is averaged with its horizontally adjacent pixels. This tends to remove noise when 32-pixel normalization is used. A standard 16-pixel height, if used instead of the 32-pixel height, seems not to provide enough resolution to make the averaging useful or desirable.

The presence of commas is potentially troublesome. If the comma touches the last letter in the word, and the word has no descenders, the comma will cause the lower edge of the bounding box to be too low and thus slightly misregister the word. This seems not to be a serious problem since the slightly misregistered word, if a keyword, will still tend to match the keyword model much better than the non-keyword model.

If the comma doesn't touch the last character, it can be removed prior to bounding box normalization. This is accomplished by performing a separate connected component analysis on the portion of the original bitmap in the lower right-hand corner of the bounding box, and deleting the rightmost connected component if it is smaller than the expected maximum size of a comma. Note that this procedure also rejects periods.

Figure 6:
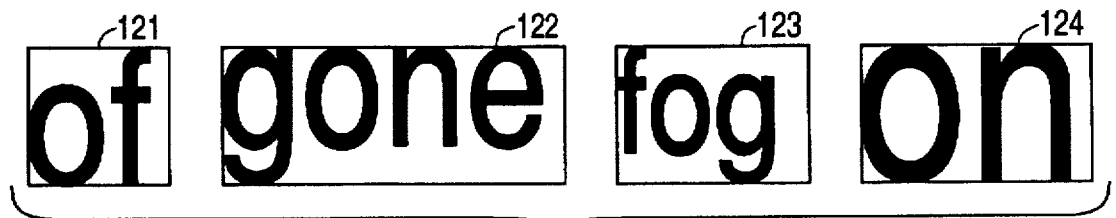
FIG. 6 shows the normalization of word height.

FIG. 6 shows schematically a number of words normalized to a standard height. In particular, four words, designated 121, 122, 123, and 124 are shown in bounding boxes of standard height. This diagram represents an idealization since as noted above, the normalized word images are gray scale images at considerably lower resolution. These four normalized words demonstrate two points. First, words originally in the same font size will be scaled by different factors, depending on the presence or absence of ascenders and descenders in letters within the word. Second, a given character scales in different ways depending on its context in the word. The letter "o" is scaled by a different factor and is vertically positioned differently, depending on whether it is in a word with ascenders only ("of"), descenders only ("gone"), ascenders and descenders ("pole"), or no ascenders or descenders ("on"). Characters with ascenders (or descenders) typically have only two possible contexts, namely ascenders (descenders) only, and ascenders and descenders.

Feature Generation

Each word is represented by a set of feature vectors where each vector characterizes certain aspects of the word shape at a particular horizontal pixel location. That is, each column of pixels has an associated feature vector. The feature generation is carried out at uniformly spaced horizontal locations, without any attempt to segment the potential keyword (or text line) into characters or sub-character segments such as strokes and arcs. Thus the segmentation is uniform rather than of a type that depends on the values of the pixels in the potential keyword.

Figure 7:
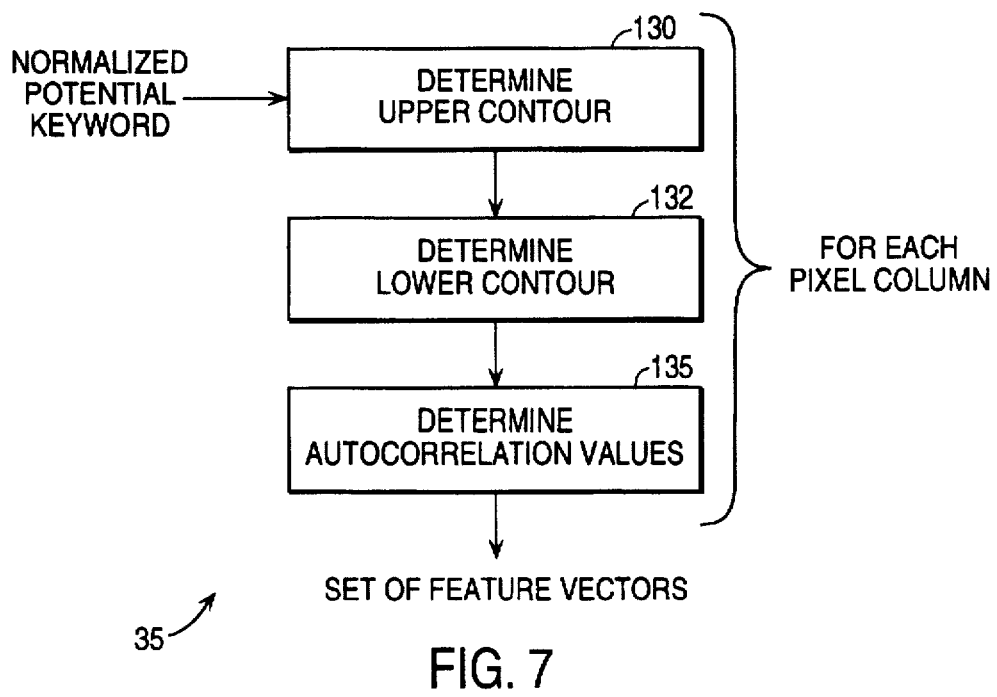
FIG. 7 is a flow diagram illustrating the steps in feature generation.

FIG. 7 is a flow diagram showing the steps carried out by feature generator 32. Each word is characterized by an upper contour relative to the top of the bounding box (determined at step 130), the lower contour relative to the bottom of the bounding box (determined at step 132), and autocorrelation values representing the internal structure of the word (determined at step 135). The feature vector for a column of pixels consists of the upper and lower contour values and a number of autocorrelation values for that column.

More specifically, the upper word contour value for a given pixel column is given by the position of the uppermost pixel in the column whose value exceeds a threshold. For 8-bit pixels, the threshold is 128 in a current embodiment. In a binary image, the value would be the position of the uppermost ON pixel. Similarly, the lower word contour value for a given pixel column is given by the position of the lowermost pixel in the column whose value exceeds a threshold. This can be seen from the idealized representations of FIGS. 8A–8D.

Figure 8A:
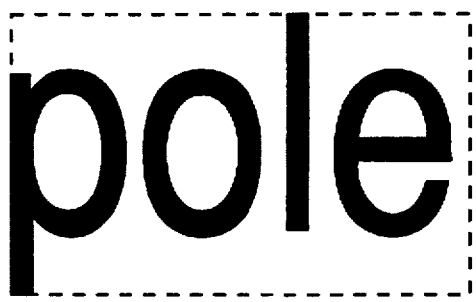
FIG. 8A shows a word in its bounding box.
Figure 8B:
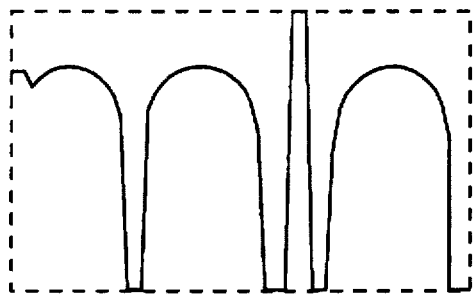
FIGS. 8B and 8C show the upper and lower word contours relative to the bounding box.
Figure 8C:
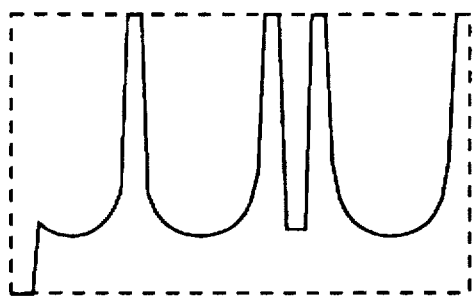
Figure 8D:
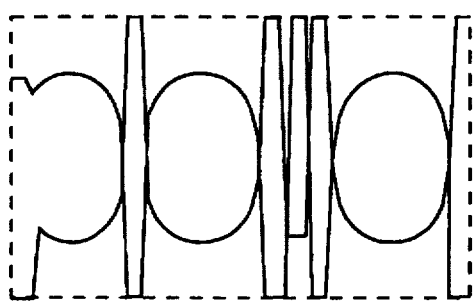
FIG. 8D shows the upper and lower word contours superimposed.

FIG. 8A shows a word ("pole") in its bounding box. For purposes of illustration, the word was sampled at approximately 64 horizontal positions. FIG. 8B shows the upper contour formed by joining the points where the 64 equally spaced vertical lines intersected the upper surface of a character in the word. Where one of the lines was located between two characters, the point was taken at the bottom of the bounding box. FIG. 8C shows the lower contour formed by joining the points where the 64 equally spaced vertical lines intersected the lower surface of a character in the word. Where one of the lines was located between two characters, the point was taken at the top of the bounding box. FIG. 8D shows the upper and lower contours superimposed in the bounding box. The inter-character spaces show as generally rectangular full-height features while the letter outlines can be discerned. The contours do not, however, characterize the internal structure of the letters in the word. For example the horizontal stroke in the "e" does not show, and based on the contours alone, it cannot be determined whether the word is "pole" or "polo."

The autocorrelation values are used to characterize the internal structure of the characters in the words. In particular, a given pixel column is shifted vertically by a particular increment, referred to as a lag, and the correlation between the shifted column and the originally-positioned column is determined in the standard way of multiplying the values of the now overlapping pixels and summing over the pixels. The maximum value is at zero lag, and values at other lags are normalized to this. In a current embodiment with 32-pixel columns the correlation is calculated for 32 lags (offsets of 0 through 31 pixels), each value is normalized relative to the value at zero lag, and neighboring groups of correlation values are averaged to provide a reduced number of averaged correlation values. Currently, seven values are used. Note that once the values are normalized relative to the value at zero lag, the normalized value at zero lag is by definition 1 and is therefore not used in the averaging since it conveys no additional information.

Figure 9:
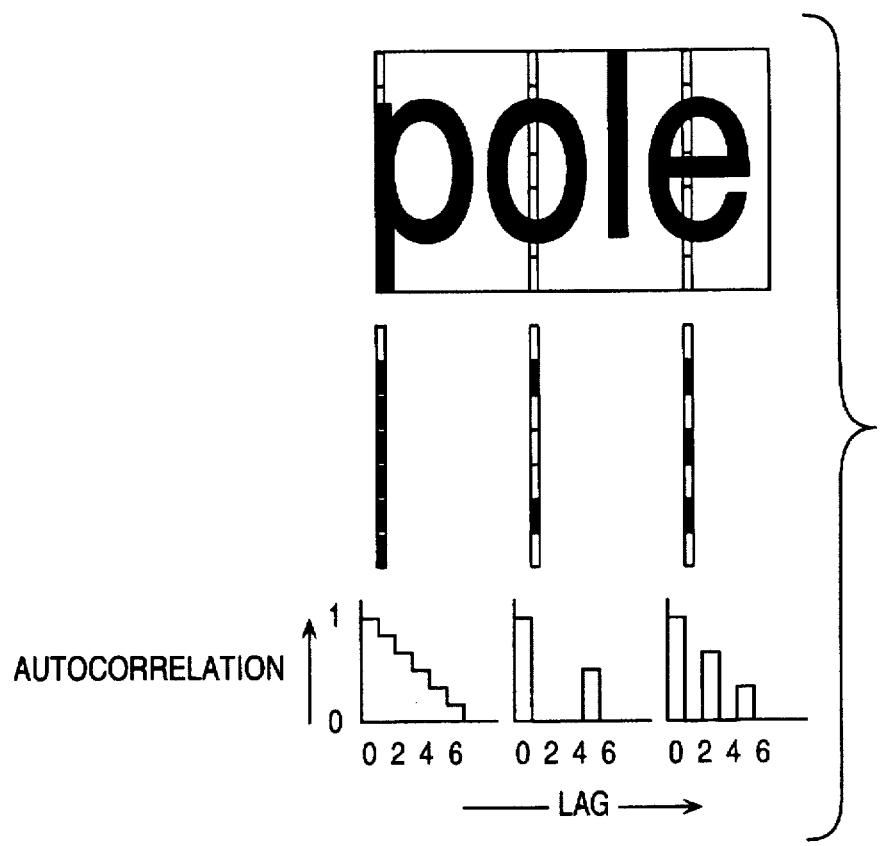
FIG. 9 shows schematically how the autocorrelation of pixel columns provides internal character structure.

FIG. 9 shows the autocorrelation determination with respect to the word "pole," the contour determination of which was described above with reference to FIGS. 8A–8D. The autocorrelation is shown for three horizontal locations, although the autocorrelation values are actually determined for each pixel column. For purpose of illustration, a binary image is shown, with the pixel columns divided into 7 segments. The value of each segment is defined to be ON if about half or more of the segment has ON pixels, and OFF otherwise.

The three illustrated locations are the vertical stroke of the "p" and central portions of the "o" and "e." As can be seen, the first horizontal location has the second through seventh segments ON, the second location has the second and sixth segments ON, and the third location has the second, fourth, and sixth segments ON.

In the current illustrative example, the autocorrelation for a given column was determined by taking the column, displacing a copy of the column vertically by lags ranging from zero to six segments, and at each lag determining the number of instances where both the original column and the displaced copy had overlapping ON segments. At a zero-segment lag, the autocorrelation is simply the number of ON segments, and this was used to normalize the autocorrelation values to have a maximum of 1. Since there are only seven segments, at a seven-segment lag, the autocorrelation is by definition 0 since the columns do not overlap. As mentioned above, in the grayscale realm of the actual embodiment, the correlation is evaluated by multiplying pixel values and summing.

The autocorrelation plots in the illustrative example reveal the internal character structure of the word at the horizontal location. For a vertical stroke (like that of the "p") or for any vertical portion of a character, the plot falls off linearly from its maximum to zero when the lag exceeds the height of the stroke or the vertical portion. For an open character portion like the center of the "o," the autocorrelation has two peaks separated by the height of the open space. For an internal character portion that contains a horizontal stroke (like the center of the "e," the autocorrelation has three peaks separated by the heights of the open spaces.

An alternative to using the autocorrelation values to characterize the internal structure of the characters is to count pixel transitions between the upper and lower contours. For the binary image example of FIG. 9, the first column (the vertical stroke of the "p") has no transitions, the second column (the central portion of the "0") has two transitions, denoting a single open region, and the third column (the central portion of the "e") has four transitions, denoting two open regions. In the grayscale realm, a transition would be defined as a transition through the pixel threshold value.

It is noted that the feature generation is carried out without the need to find character baselines or x-height (the height of a lowercase letter with no ascenders or descenders such as a lowercase "x"). Techniques for extracting baseline and x-height information tend not to be robust, and tend not to work at all for single words or acronyms. The location of bounding boxes is robust, and thus allows robust feature generation and spotting.

Hidden Markov Model (HMM) Overview

Hidden Markov modeling is a statistical technique commonly used in speech recognition to model variability in the speech to be recognized. Such variability results not only from different speakers, but from different rates of speaking. In the present invention, hidden Markov modeling is applied to character (actually word) recognition. Here, the variability results from different character sizes and fonts, and from noise in the image produced by scanners, copiers, and facsimile machines.

A hidden Markov model (HMM) consists of a set of states, with probabilistic transitions between states, and probability distributions of observed feature vectors associated with each state. In speech recognition, these feature vectors represent the spectral content of the speech at a given time. In the word-image spotting system, the feature vector consists of the upper and lower contours of a character within a word at a given position combined with the correlation lag features at that position. Transitions between states specify the sequence of observations. By associating probabilities with the transitions between states, as well as with the observations of each state, HMMs can be used to statistically model variability in speech or character images.

More formally, an HMM consists of a set of N states $S_1 \ldots S_N$, a set of transition probabilities $a_{ij}$, i=1 ... N, j=1 . . N, where $a_{ij}$ is probability of a transition from state i to state j, and a set of probability distributions $b_i(x)$, i=1 ... N, where $b_i(x)$ is the probability of being in state i and observing feature vector x.

Recognition using HMMs can be performed as follows. Each object to be recognized is modeled by an HMM. A given observation sequence X of length T ($X=x_1 \ldots x_T$) is recognized as the object corresponding to the HMM determined most likely to have generated the sequence X. One way of doing this is by computing the likelihood of X given each HMM, using the forward algorithm (See Rabiner). A more efficient method is the Viterbi algorithm, which proceeds as follows. The HMMs for each object to be recognized are connected in parallel to form a network. The symbols $P_1 \ldots P_M$ denote the prior probability of each object. Given a sequence of observations $X=x_1 \ldots x_T$, the Viterbi algorithm (See Rabiner) can be used to find the sequence of states through the network that most likely generated the sequence X. Because each state sequence is specific-to the HMM of one of the objects to be recognized, the optimal state sequence specifies the object to be recognized.

The parameters for an HMM are the transition probabilities $a_{ij}$ and the observation probabilities $b_i(x)$. These parameters can be learned by training the HMM with a set of observation sequences X known to have been generated by the object modeled by the HMM. An algorithm known as the Baum-Welch procedure (See Rabiner) is commonly used.

Character and Keyword HMMs

Each alphanumeric character, as well as any space following it, is represented by a context-dependent HMM. As discussed above, the context for the character models depends on the presence of ascenders and descenders in a word. Up to four models are required for each character in the contexts resulting from ascenders only, descenders only, both ascenders and descenders, or neither ascenders nor descenders.

A character HMM is defined by a sequence of states, with probabilistic transitions between states, and features associated with each state. The number of states in the HMM is tailored to the character, and each state is described by a probability distribution of the feature vectors that characterize that portion of the character. Typically, 2-5 states are used to model a character. A final state is added to all characters to model intercharacter space. All states have Gaussian observation distributions, which are characterized by a mean vector and a diagonal covariance matrix. While states corresponding to portions of characters have a unique Gaussian observation distribution, the states corresponding to intercharacter space in one context share a single common distribution. Such space states are said to have tied output. The result is that intercharacter space is treated identically, independently of the adjacent characters, for a given context. The distribution is a mixture of three Gaussians to model three cases in which space may occur between characters: no touching between characters; touching at the top only; and touching at the bottom only.

Figure 10A:
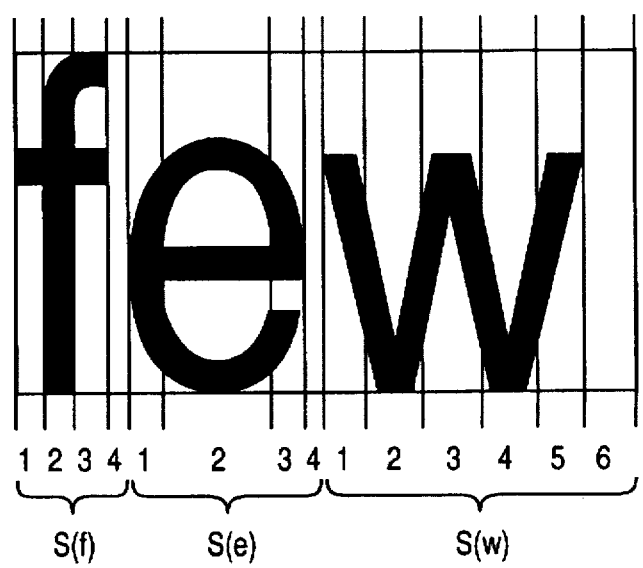
FIG. 10A shows the states for a few representative characters.

FIG. 10A is an idealized representation of how the states relate to the structure of a few representative characters, in particular the lowercase letters "f", "e", and "w". The word "few" is shown in its bounding box, and the vertical lines delineate the states. The actual delineation of the states is determined in training. Each of the letters "f" and "e" has three states corresponding to distinct portions of the letter structure; the letter "w" has five states. In the context of the word "few" as shown, each set of character structure states is followed by a state corresponding to the space between characters.

Figure 10B:
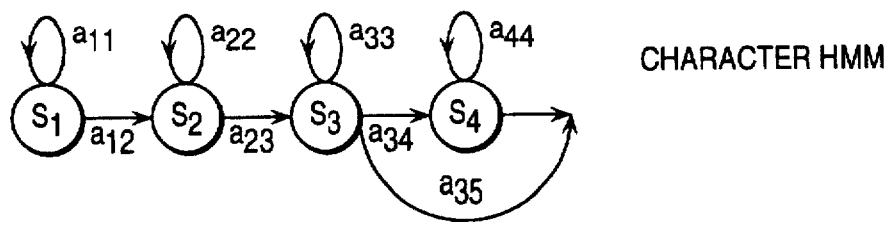
FIGS. 10B and 10C are state diagrams for the character HMMs.
Figure 10C:
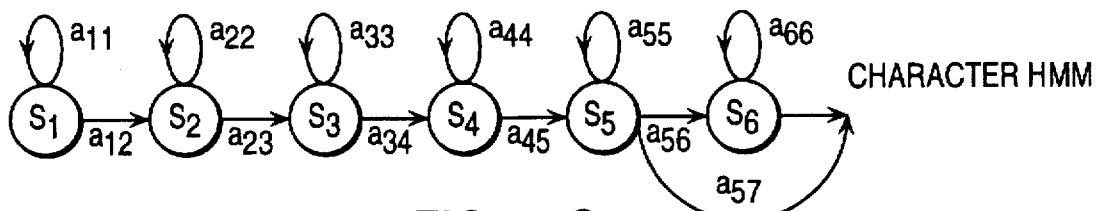
Figure 10D:
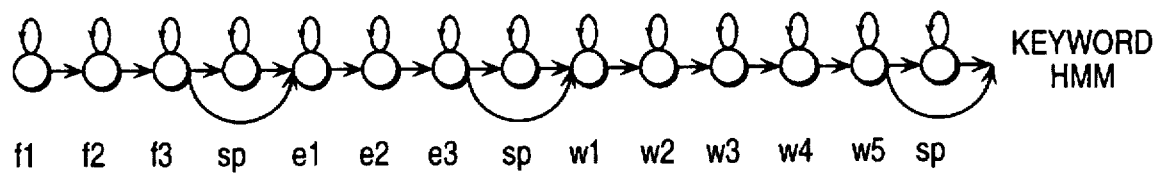
FIG. 10D is a state diagram for a keyword HMM constructed from the character HMMs.

FIG. 10B shows the HMM state diagram for either of the characters "f" and "e". The model consists of the three states $S_1$, $S_2$, and $S_3$, which generate observations specific to the character, and the state $S_4$ which generates intercharacter space according to the tied distribution. The $a_{ij}$ are the probabilities of transitions between states $S_i$ and $S_j$. The possible transition from state $S_3$ with probability $a_{35}$ represents skipping the space state $S_4$ and jumping to the first state in the next character in the event that there is no space between the two characters in the potential keyword. FIG. 10C shows the state diagram for the "w" where state $S_6$ is the optional space state. FIG. 10D shows how whole word models are built by linking the character models corresponding to the characters in the context of the word.

Certain characters occur in multiple distinct forms. For example, the letter "a" also appears in some fonts and in italic versions of other fonts as "a." To account for this, separate character models are created for the multiple variants, and separate keyword models are created for any keyword containing such characters.

The letters "i" and "j" also present special cases when no ascenders are present in the word. The bounding box for such words may or may not include the dot. To account for this, two keyword models are built, one for the context of no ascenders and one for the context assuming an ascender is present.

The character HMMs are trained using text in different fonts. Training involves learning the observation distributions for each state of each character, the observation distribution for the space state, as well as the transition probabilities $a_{ij}$ between states using the standard Baum-Welch technique. Training data consists of whole words containing each character in the various contexts. It is not necessary to mark the boundaries of the individual characters (See Paul). To insure that the models are correctly initialized, a preliminary training set is used in which inter-character space is always present.

Non-Keyword HMMs

A non-keyword HMM is used to model words in the image which are not keywords. The use of a non-keyword model allows the keyword score to be compared to the non-keyword score rather than to an arbitrary threshold which is dependent on image quality and the font.

The models may be context-insensitive or context-sensitive. In a context-sensitive model, the four word contexts used in the character models (#1-ascender only, #2-descender only, #3-ascender and descender, or #4 -neither ascenders nor descenders present) are represented by separate parallel paths, without a return loop, in the non-keyword model. The optimal path through the HMM for a non-keyword is thus constrained to a single context.

Non-keywords may be modeled at either the character level or subcharacter level. At the character level, each symbol in the character set is modeled by the corresponding context-sensitive character HMM that was trained as described earlier. To create a context-insensitive, character-based, non-keyword model, the set of pre-trained character HMMs are connected in parallel.

Figure 11A:
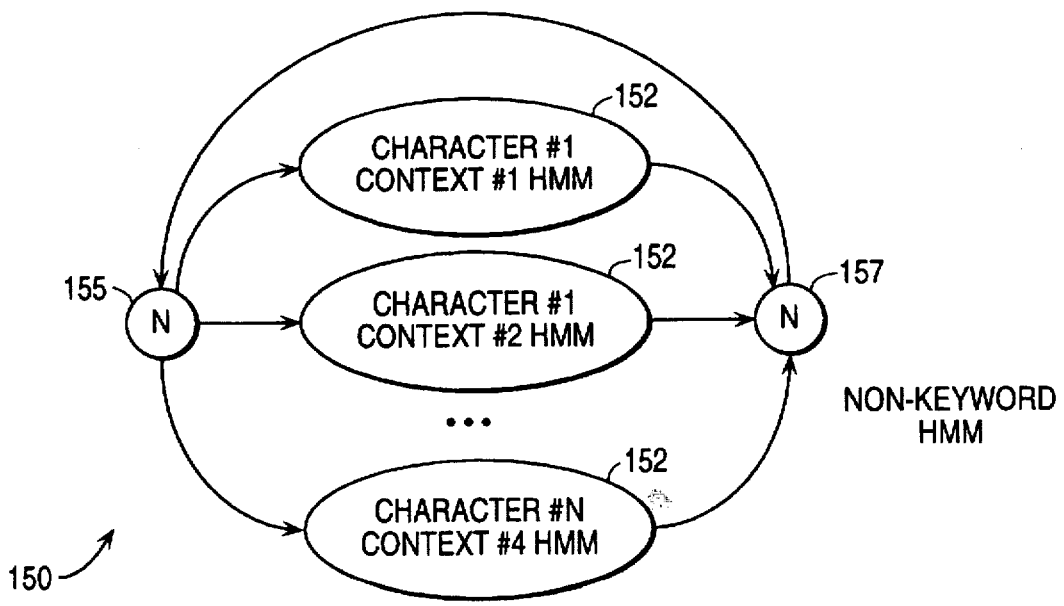
FIG. 11A is a state diagram for a context-insensitive non-keyword HMM constructed from character HMMs.

FIG. 11A is a state diagram for a context-insensitive, character-based, non-keyword HMM 150. The HMM comprises a number of character HMMs 152 connected in parallel between a pair of null states 155 and 157, and includes a return loop between null states 155 and 157. The character set is assumed to include N characters, including uppercase and lowercase letters, numbers, and special characters. Up to four separate character HMMs are provided for each character in the set. The number of HMMs for a given character depends on which of the four possible contexts are applicable to that character. HMM 150 is context-insensitive in the sense that the optimal path for a non-keyword through the HMM is not constrained by the context of the characters in the non-keyword.

A context-sensitive, character-based, non-keyword model is created by first connecting the pre-trained character HMMs for a given context in parallel, producing four HMMs, one for each context. The four HMMs are then connected in parallel to create a context-sensitive non-keyword HMM.

Figure 11B:
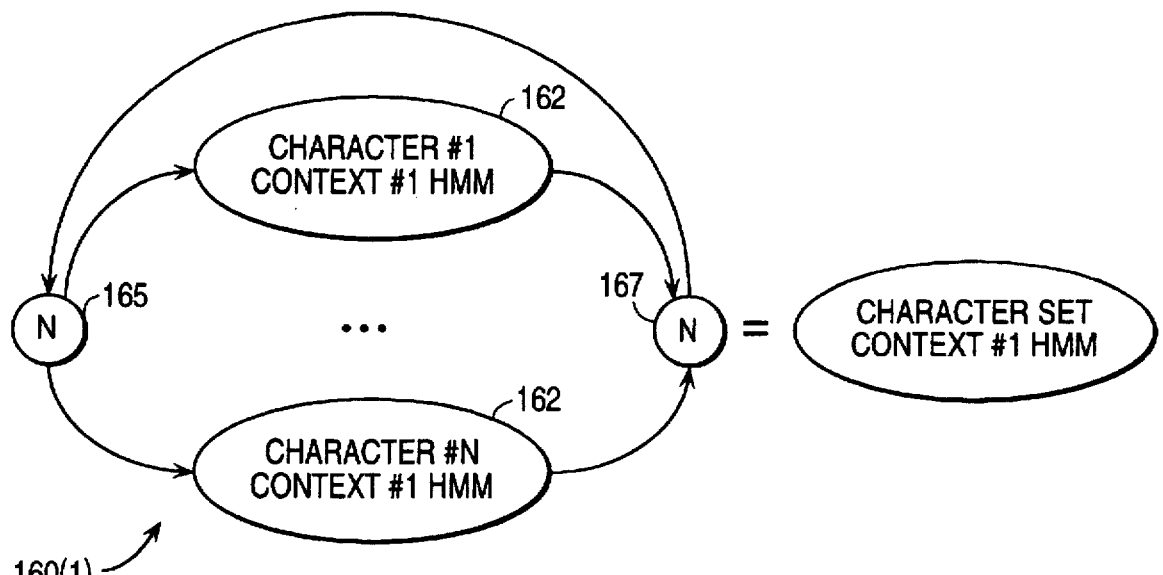
FIGS. 11B and 11C are state diagrams for a context-sensitive character set HMM and a context-sensitive non-keyword HMM constructed therefrom.

FIG. 11B is a state diagram for a single-context character set HMM 160(1) that is used as a component of a non-keyword HMM. The HMM comprises character HMMs 162 connected in parallel between a pair of null states 165 and 167, and includes a return loop. HMM 160(1) differs from HMM 150 in FIG. 11A in that HMM 160(1) includes only the character HMMs that can appear in that single context, in this case context #1. Similar HMMs are constructed for the other contexts.

Figure 11C:
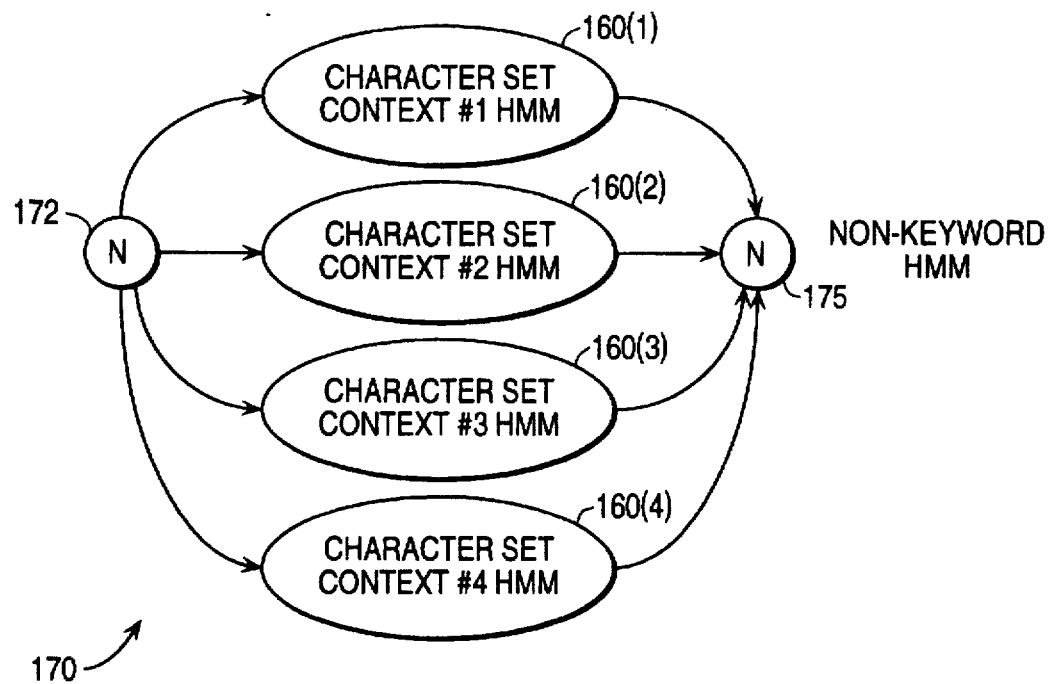

FIG. 11C is a state diagram of a non-keyword, context-sensitive, character-based HMM 170 comprising four single-context character HMMs 160(1), 160(2), 160(3), and 160(4) connected in parallel between a pair of null states 172 and 175. This HMM is context-sensitive in the sense that the optimal path for a non-keyword through the HMM is constrained by the context of the characters in the non-keyword.

To model non-keywords at the subcharacter level, columns of pixels in a word bounding box, or image-slices, are represented by states with Gaussian distributions. The observation distributions and transition probabilities for a subcharacter-based HMM are trained using the same data as for the character models.

Figure 12A:
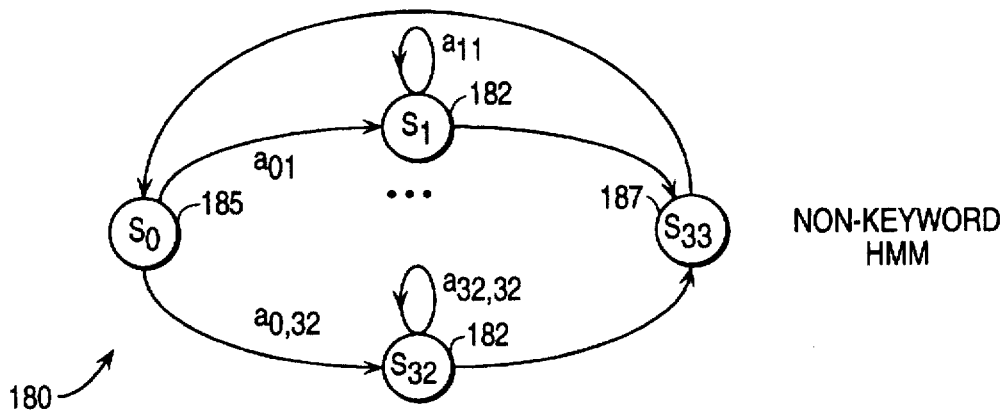
FIG. 12A is state diagram for a context-insensitive non-keyword HMM constructed from Gaussian states representing image slices.

FIG. 12A shows a context-insensitive, image-slice-based, non-keyword HMM 180. This non-keyword HMM is created as a parallel network of states 182 (designated $S_1$–$S_{32}$) between a pair of null states 185 and 187 ($S_0$ and $S_{33}$) with a return loop. States $S_1$ through $S_{32}$ are output generating states with Gaussian distributions, while states $S_0$ and $S_{33}$ are null states. The output distributions and transition probabilities $a_{ij}$ for this non-keyword HMM are trained using the same data as for the character models, except the labels are not used. The means of the Gaussian output distributions for the states are initialized randomly.

Figure 12B:
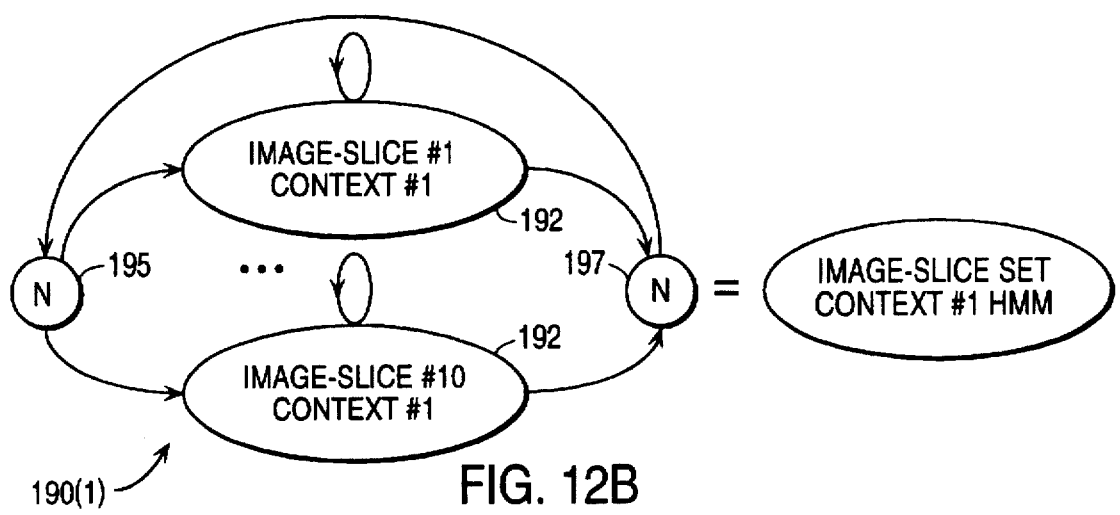
FIGS. 12B and 12C are state diagrams for a context-sensitive image-slice HMM and a context-sensitive non-keyword HMM constructed therefrom.

FIG. 12B is a state diagram for a single-context image-slice HMM 190(1) that is used as a component of a context-sensitive non-keyword HMM. The HMM comprises a number of states 192 (10 in a current embodiment) with Gaussian distributions representing image-slices connected in parallel between a pair of null states 195 and 197, and includes a return loop. It has been found that, for a given context, a set of approximately ten states allows all the characters to be represented.

In a context-sensitive model, the data is labeled with the word context, which is derived from the word label used to train the character models. The labels are used to determine which of the submodels to train.

Figure 12C:
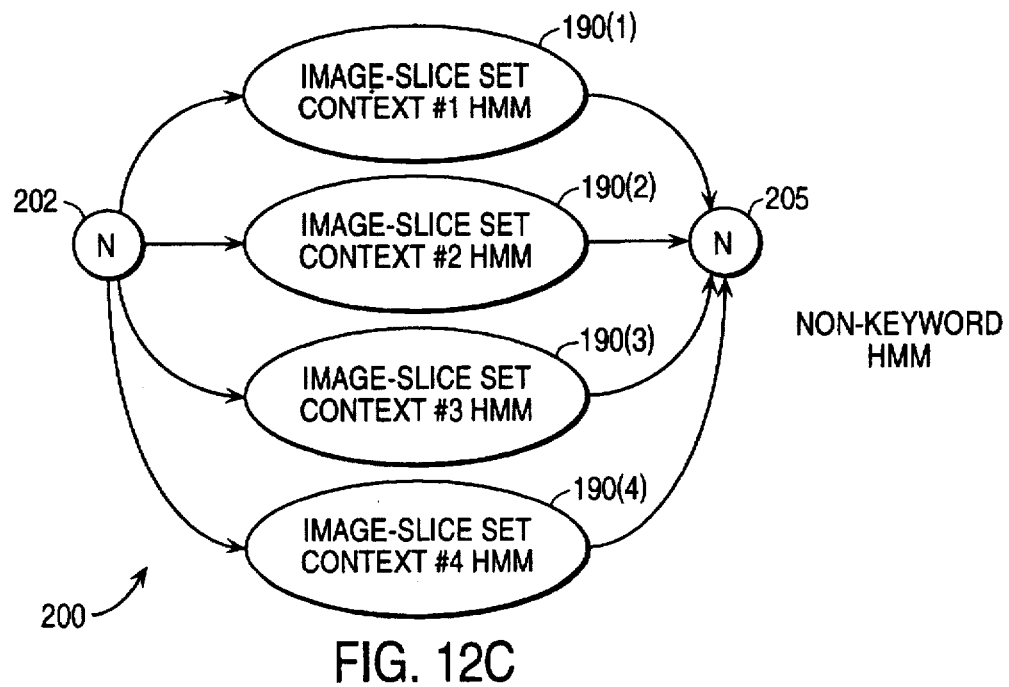

FIG. 12C is a state diagram of a context-sensitive, image-slice based, non-keyword HMM 200 comprising four single-context image-slice HMMs 190(1), 190(2), 190(3), and 190(4) connected in parallel between a pair of null states 202 and 205. This HMM is context-sensitive in the sense that the optimal path for a non-keyword through the HMM is constrained by the context of the characters in the non-keyword.

Spotting Keywords That Are Parts of Longer Words

Sometimes the exact form of the keyword is not known in advance. For example, the user could be interested in a noun, regardless of whether it is singular or plural, or a verb, regardless of tense or person. The keyword can also be part of a hyphenated or non-hyphenated compound word. To the extent that it is possible to extract a root form of the keyword, even if the root form is a word fragment, the present invention provides techniques for spotting such a root form embedded in a longer word. This capability is also relevant to languages, such as Japanese, where inter-word space is not used to delineate words.

Figure 13A:
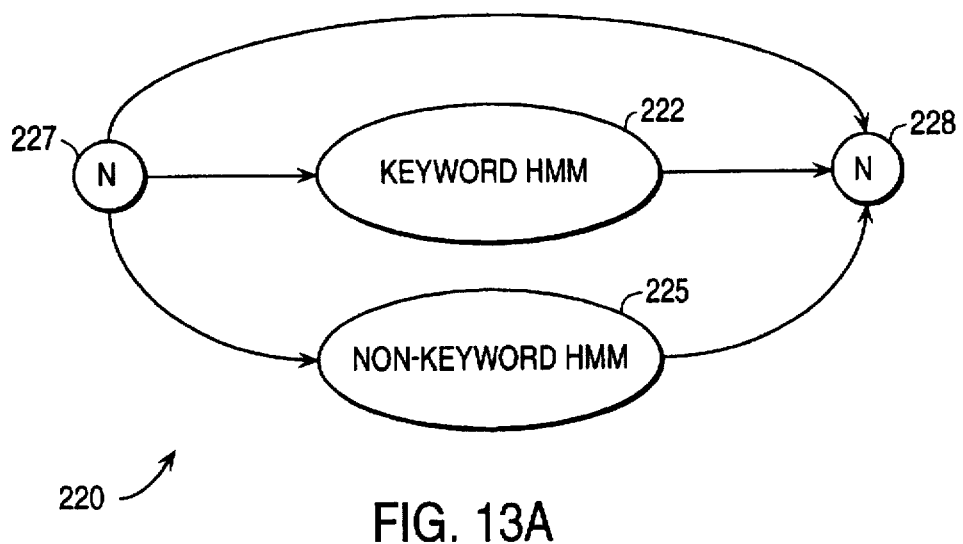
FIGS. 13A and 13B are state diagrams for HMMs used for spotting keywords that are part of unspecified longer words.

FIG. 13A is a state diagram for a first type of keyword HMM 220 that may be used in a network to recognize a keyword that is part of a longer word. The HMM comprises a keyword HMM component 222 and a non-keyword HMM component 225, connected in parallel between a pair of null states 227 and 228, and includes a return loop. The return loop allows for multiple occurrences of the keyword in the longer word. Keyword HMM component 222 is constructed as a concatenation of character HMMs as described above, while non-keyword HMM component 225 may be character-based or image-slice-based as described above. If the non-keyword HMM component is context sensitive, it would have the same context as the keyword HMM component.

While the keyword property relating to ascenders and descenders is known, the appropriate context for the model may become unknown when the keyword is part of a longer word, which is unknown. Specifically, if the keyword has ascenders only, the composite word may have ascenders only or ascenders and descenders. Therefore the keyword model would be a network comprising an HMM of FIG. 13A for the ascenders only context connected in parallel with an HMM of FIG. 13A for the ascenders-and-descenders context.

If the keyword has descenders only, the composite word may have descenders only or ascenders and descenders. Therefore the keyword model would be a network comprising an HMM of FIG. 13A for the descenders-only context connected in parallel with an HMM of FIG. 13A for the ascenders-and-descenders context.

If the keyword has ascenders and descenders, the composite word has ascenders and descenders. Therefore the keyword model would be a single HMM of FIG. 13A for the ascenders-and-descenders context.

If the keyword has neither ascenders nor descenders, the composite word may have either, none, or both. Therefore, the keyword model would be a network with the parallel connection of the HMM of FIG. 13A for all four contexts.

Figure 13B:
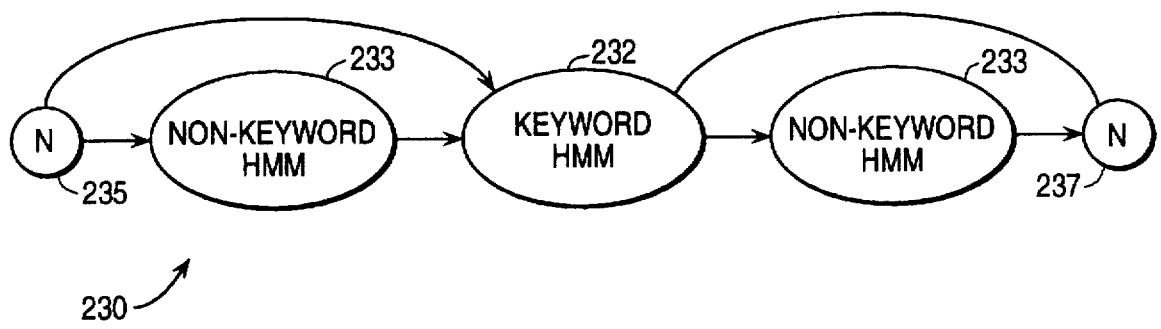

FIG. 13B is a state diagram for a second type of keyword HMM 230 that may be used in a network to recognize a keyword that is embedded in a longer word. The HMM comprises a keyword HMM component 232 in series with a pair of non-keyword HMM components 225, connected between a pair of null states 235 and 237. Skip paths are provided to accommodate the possibility that the keyword is at the beginning or end of the composite word. This HMM does not include a return loop.

Using a keyword HMM such as shown in FIGS. 13A and 13B, a user could search for the verb "swim" as it may appear in "swims" or "swimming," by providing the keyword "swim," but would not locate instances of the form "swam." There are also a number of instances where a user is interested in a particular root form of a keyword, possibly in connection with only some prefixes or suffixes. For example, a user might be interested in the above forms of "swim" but not in the word "swimsuit."

If the set of possible prefixes and suffixes is known, it is normally preferred to build separate keyword models as concatenations of character models for the various possible combinations.

Keyword Spotting Network

Figure 14:
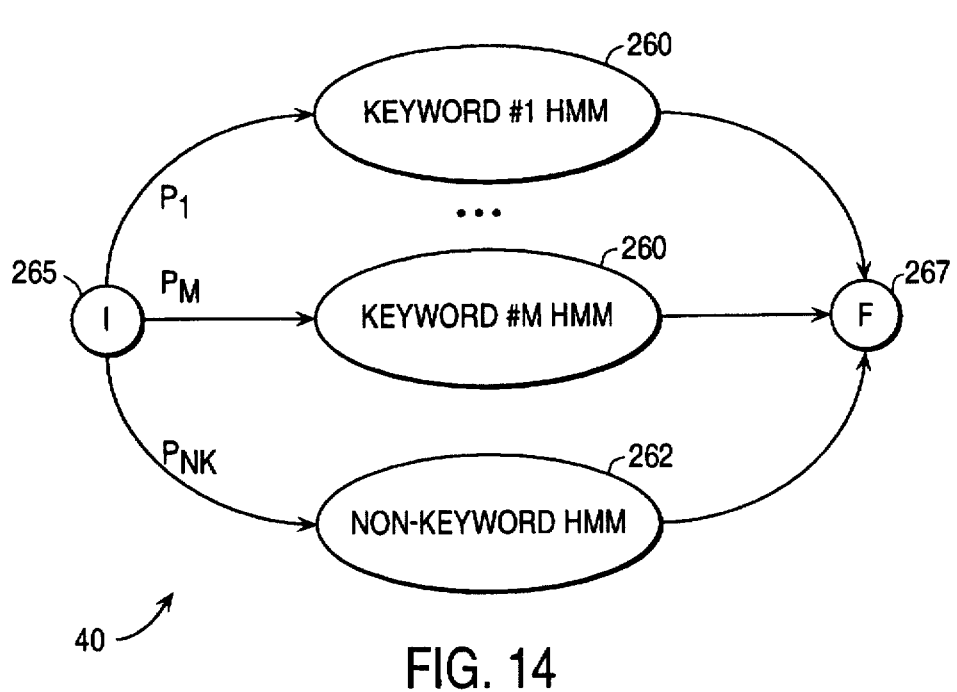
FIG. 14 is a state diagram of a keyword spotting network.

FIG. 14 is a state diagram of the HMM network 35 for keyword spotting. The network includes keyword HMMs 260 and a non-keyword HMM 262 connected in parallel between a start or initial state 215 and a stop or final state 217. The keyword and non-keyword HMMs are constructed as described above in connection with FIGS. 10B–D and 13A–B (keyword HMMs) and FIGS. 11A–C, and 12A–C (non-keyword HMMs). As noted above, separate keyword HMMs are provided for any keyword containing certain characters that occur in multiple forms. Similarly, two separate keyword HMMs are preferred when the keyword includes an "i" or a "j" and no characters with ascenders. Additionally, if the search is intended to be case-insensitive, separate word models are provided for all-lowercase, all-uppercase, and lead-uppercase variants.

Spotting is performed using a Viterbi search through the network. If the optimal path lies through the keyword HMM, the keyword is considered recognized. Otherwise in the case of the character-based non-keyword model, the path will define a sequence of characters through the non-keyword HMM, thus performing in a sense as an optical character recognition system. In the case of the image-slice non-keyword model, the potential keyword is identified as a non-keyword. In the case where the keyword HMM contains a keyword HMM component and a non-keyword HMM component, the keyword is recognized only if the optimum path passes through the keyword HMM component.

It is possible to apply all the potential keywords to the spotting network, but it is generally preferred to limit the potential keywords. One approach to limiting the potential keywords is to reject those whose bounding box lengths are inconsistent with the keyword. As mentioned above, character width is generally on the order of 10–30 pixels for a 32-pixel height. Thus, based on the particular characters in a keyword, it is possible to estimate the length of the potential keyword, and potential keywords that are much longer or shorter can be rejected. It is also possible to eliminate these at the word boxing stage, and avoid the computation needed for feature extraction. However, it is anticipated that many applications will require multiple searches on the same document, in which case it is useful to retain the feature information for all words, even if such words are too long or too short to meet the current search criteria.

Although a 100% success rate (all instances of the keyword recognized) with no false alarms (no non-keywords recognized) is a noble goal, noise and font variations make attainment of this goal unlikely, and tradeoffs are generally required. Certain applications may require that substantially all instances of the keyword are recognized, and can tolerate false alarms. Other applications may be more tolerant of keyword misses but may be severely prejudiced by too many false alarms. The recognition and false alarm rates can be controlled by varying the transition probabilities from the start state to the keywords ($P_1 \ldots P_M$) and to the non-keywords ($P_{NK}$).

Spotting Words in Lines of Text

Spotting keywords in text line boxes rather than word boxes allows spotting for multi-word phrases. If this capability is desired, the keyword model is created as a series connection of HMMs of the individual words, separated by interword space models. The interword space model is preferably optional so that a search for "key word" will also find "keyword". In a sense, the optional interword space model can be considered a special character.

To spot words embedded in lines of text, bounding boxes for potential lines of text are first identified. This may be performed using morphological operations in a manner similar to the identification of word bounding boxes. The image is reduced by 2× and vertical and horizontal closing operations are performed. The vertical SEs are in the same range of sizes as used in word bounding box identification. The corresponding horizontal SEs are larger so to insure that a horizontal closing merges words on the same line, but not so large as to merge words across columns, optionally, columns of text may be pre-identified and the morphological operations performed on each column to identify lines. As in word bounding box identification, line bounding boxes from differently-sized pairs of SE's are merged, and duplicates, undersized, or oversized components are removed. The number of line bounding boxes may also be reduced by determining the column locations and then removing bounding boxes which do not correctly span a column. Prior to feature extraction, white space should be removed from the right side of each text line, as well as the left side, top, and bottom.

The HMM for spotting words in lines of text assumes that each word is separated from the next by an interword space that is larger than an intercharacter space. The exact location of the keyword in the line can be determined by identifying the pixel column positions which align with the keyword model.

Figure 15:
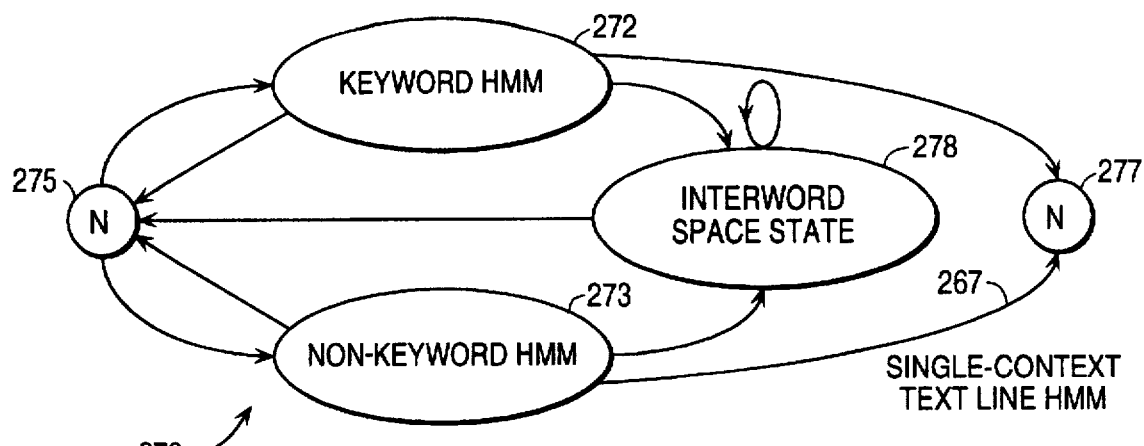
FIG. 15 is a state diagram for an HMM used for spotting keywords in an undifferentiated line of text.

FIG. 15 is a state diagram of a single-context HMM 270 used for modeling a keyword embedded in a text line. The HMM comprises a keyword HMM component 272 and a non-keyword HMM component 273 connected in parallel between a pair of null states 275 and 277. Provision is made for transitions from the keyword and non-keyword HMM components to an interword space state 278. There are also return loops from the keyword and non-keyword HMM components and the interword space state to null state 275. Keyword HMM component 272 can itself be a network of parallel-connected keyword HMMs for searching multiple keywords.

The context issue discussed above in connection with keywords that are parts of longer words arises in the text line setting as well. It is sometimes necessary to model a keyword in more than one context. If the keyword has ascenders only, the text line in which it occurs may have ascenders only, but may also have ascenders and descenders. Similarly, if the keyword has descenders only, the text line in which it occurs may have descenders only, but may also have ascenders and descenders. If the keyword has neither ascenders nor descenders, the text line in which it occurs may have neither ascenders nor descenders, but also may contain descenders only, ascenders only, or ascenders and descenders.

Figure 16A:
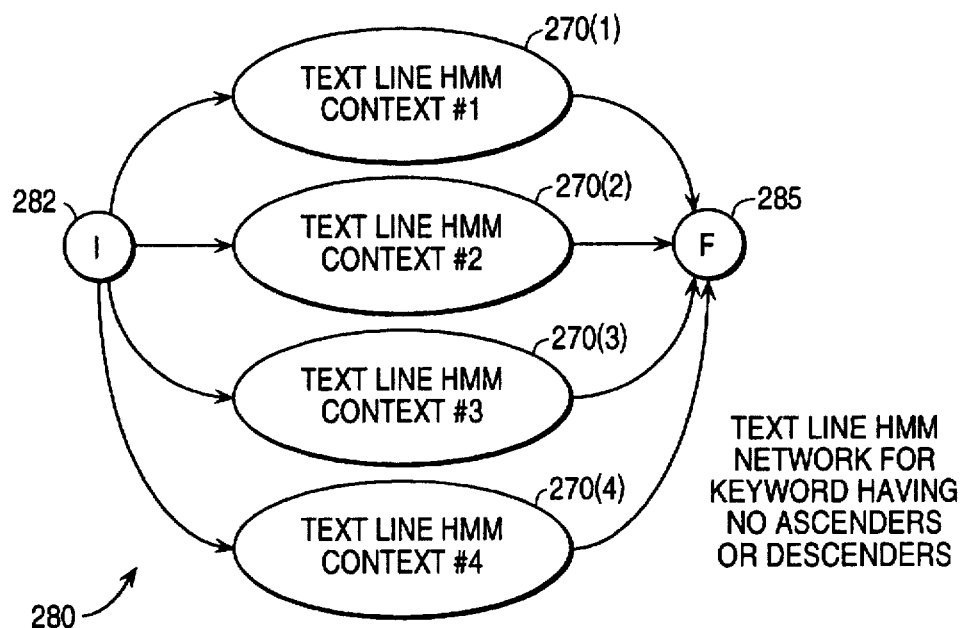
FIG. 16A and 16B are state diagrams of text line HMMs for particular keyword contexts.

Thus a keyword having neither ascenders nor descenders must be modeled by a network 280 as shown in FIG. 16A. The network contains text line HMMs 270(1), 270(2), 270(3), and 270(4), which are the HMM of FIG. 15 in each of the four possible contexts, connected in parallel between an initial state 282 and a final state 285.

Figure 16B:
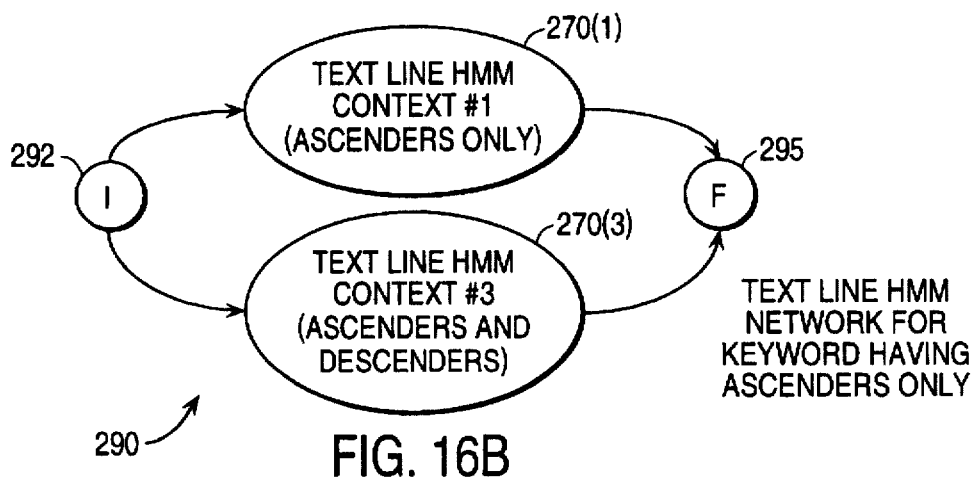

A keyword having ascenders only must be modeled by a network 290 as shown in FIG. 16B. The network contains text line HMMs 270(1) and 270(3) connected in parallel between an initial state 292 and a final state 295. Text line HMMs 270(1) and 270(3) are the HMM of FIG. 15 in each of the two possible contexts of ascenders only and both ascenders and descenders.

A keyword having descenders only must also be modeled by a network that contains text line HMMs connected in parallel between initial and final states. This time, however, the text line HMMs are the HMM of FIG. 15 in each of the two possible contexts of descenders only and both ascenders and descenders. Only keywords having both ascenders and descenders are guaranteed to be only in text lines with both ascenders and descenders, and can thus be modeled directly with the HMM of FIG. 15 in the context of both ascenders and descenders.

Alternative Embodiment of Word Boxer and Text Line Boxer

As described above, there is no single size of SE that will close up intercharacter space while not closing up interword space when the image is subjected to a morphological close operation. Thus the approach described above in connection with FIG. 3 subjects multiple copies of the image to close operations with different sizes of SE. This multi-pass approach has the advantage that the technique is applicable to a document that contains many sizes of font. An alternative approach, to be described below, has some possible computational advantages, since it only processes a single copy of the image.

While the multi-pass approach tends to eliminate halftones and graphics by virtue of the upper bound on the bounding box size, the alternative approach assumes that the image has been subjected to processing that has eliminated non-text components such as horizontal and vertical rules, graphics, and halftones. This type of image segmentation can performed by any of a number of techniques, such as those described in the following patent documents, all of which are incorporated by reference for all purposes:

U.S. Pat. No. 5,065,437, issued Nov. 12, 1991, to Bloomberg, titled IDENTIFICATION AND SEGMENTATION OF FINELY TEXTURED AND SOLID REGIONS OF BINARY IMAGES;

Allowed application Ser. No. 07/449,626, filed Dec. 8, 1989, by Bloomberg, titled SEGMENTATION OF TEXT AND GRAPHICS; and Pending application Ser. No. 07/854,156, filed Mar. 20, 1992, by Bloomberg, titled USE OF FAST TEXTURED REDUCTION FOR DISCRIMINATION OF DOCUMENT IMAGE COMPONENTS.

The above-referenced U.S. Pat. No. 5,065,437 contains source code for performing a variety of morphological operations.

Figure 17:
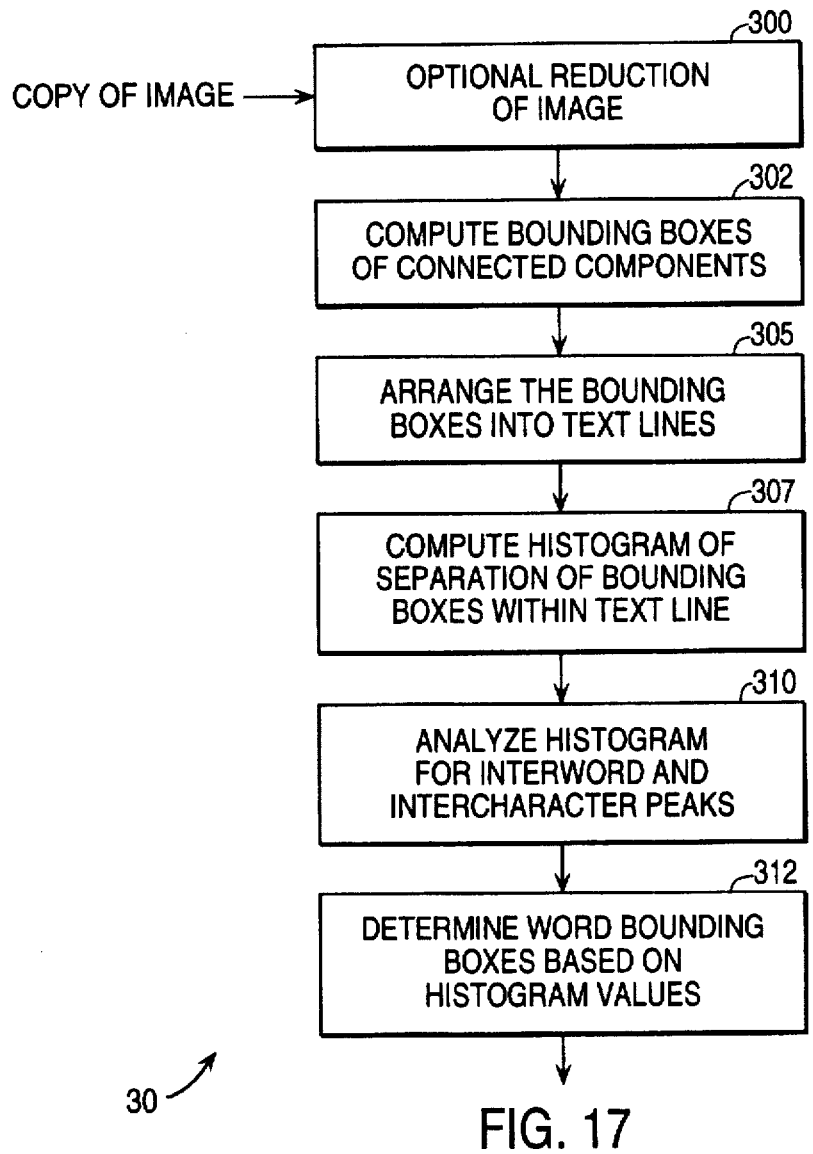
FIG. 17 is a flow diagram of an alternative technique for determining word boxes.

FIG. 17 is a flow diagram illustrating the alternative technique for finding word bounding boxes in an image. The analysis of the image may be carried out at full scale or at some level of reduction. To that end, a copy of the image is optionally reduced (step 300). This can be by a factor of 2 or 4, either as a thresholded reduction (threshold of 1 or 2 for a 2×2 reduction) or by subsampling. The image, possibly reduced, is then subjected to an analysis that computes the bounding boxes of all connected components (step 302). This may be done as described above in connection with FIG. 4.

Next, the bounding boxes are arranged in text lines (step 305), preferably being sorted in row-major order, starting at the top of the image, and sorting from left to right within a given text line. In this connection, it is assumed that the text lines run horizontally in the image. If not, the image would be rotated, or the ordering would be on the basis of text lines that ran vertically.

A histogram of the space between bounding boxes is then generated (step 307). If the image contains text of approximately the same size, the histogram can be a single histogram, namely one taken over the entire image. If, on the other hand the image contains text blocks of different font sizes, a single histogram may not be preferred. If the image has been segmented so that the separate text blocks have been identified, a histogram can be generated for each text block, and the analysis described below based on the histogram information can be carried out on each text block individually to obtain the word boxes.

The histogram is then analyzed (step 310) to obtain intercharacter and interword spacing information. In particular, the histogram should contain two separated peaks. The first peak, which corresponds to intercharacter space, is at a smaller value of separation but contains a larger number of samples than the second peak, which corresponds to interword space. The low point between the two peaks is defined as the threshold spacing, and should be larger than the samples in the first peak and smaller than the samples in the second peak. Based on the histogram information, the word bounding boxes are determined (step 312) in either of two ways.

Figure 18:
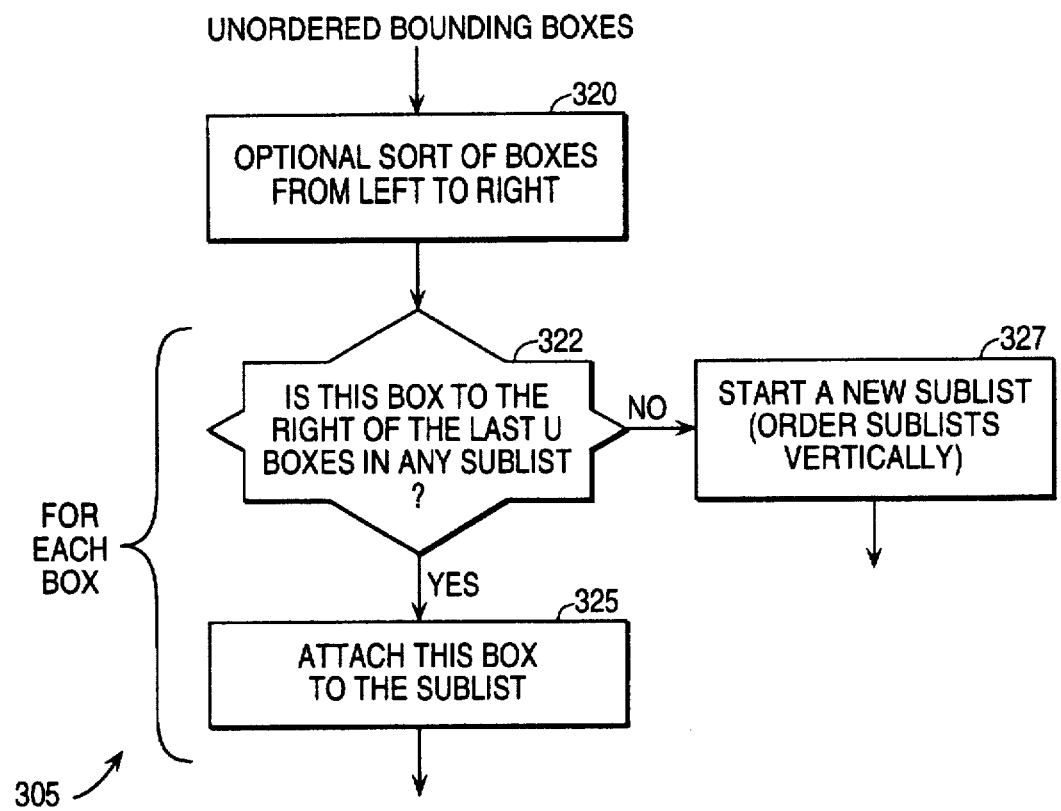
FIG. 18 is a flow diagram of a technique for arranging the bounding boxes into text lines.

FIG. 18 is a flow diagram illustrating step 305 of generating the ordered list of bounding boxes in the text lines. The set of bounding boxes is first sorted from left to right (step 320). This sort is optional, but preferred since it speeds up the subsequent processing. Text lines are built up as sublists. Each box is tested to determine whether it is to the right of a certain number (U) of the last (rightmost) boxes in any sublist (branch 322). U is a parameter to be discussed below. If it is, the box is attached to the end of the sublist (step 325); if not, the box is used as the start of a new sublist (step 327).

The test whether a box is to the right of the last U boxes of an already existing sublist, and thus belongs to that already existing sublist is performed according to the rule that the new box belongs in the sublist if there is any vertical overlap or at least near-overlap with at least one of the last U boxes in the sublist. Typically, the test involves more than the last box, since a test for overlap with only the last box in the sublist could result in punctuation marks preventing any new boxes from being added to the sublist. At the same time, the parameter U cannot be too large or large image skew could result in crossed text lines. It has been found that requiring no more than 6 pixels of vertical separation (non-overlap) with respect to the last 2 boxes provides good results.

Sorting step 320 is optional, but makes the subsequent generation of the text lines much faster. If the list of boxes were not presorted from left to right, the step of constructing the text lines (sublists) would be on the order of $n^2$ where n is the number of boxes. With the sort, the later step is on the order of $n^{1.5}$. The sort itself is on the order of something between $n \log n$ and $n^{1.5}$.

Figure 19A:
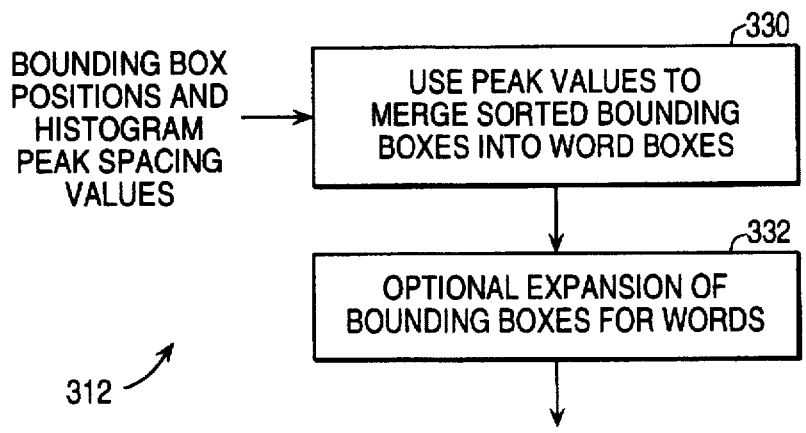
FIGS. 19A and 19B are flow diagrams of different techniques for using histogram information to determine the word boxes.

FIG. 19A is a flow diagram of a first way to use the histogram information to generate the word bounding boxes. Bounding boxes in each of the ordered sublists are combined with their neighbors if the spacing is less than the threshold and are not combined if the spacing is at or above the threshold (step 330). The selectively merged bounding boxes are then expanded (step 332) by the same scale factor that characterized the optional reduction.

Figure 19B:
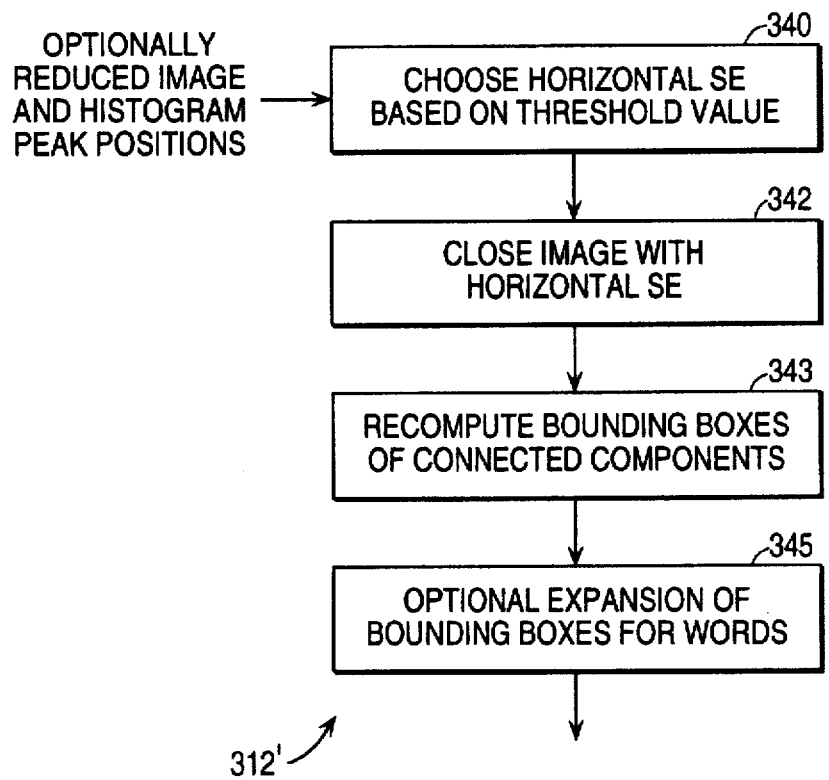

FIG. 19B is a flow diagram of a second way to use the histogram information to generate the word bounding boxes. An SE size is chosen (step 340) based on the peak positions in the histogram. The optionally reduced image is closed (step 342) with a horizontal SE so sized that the individual characters merge but the words in the text line do not. The image, thus closed, is then subjected to an analysis that computes the bounding boxes of all connected components (step 343). The bounding boxes, thus determined, are then expanded (step 345) by the same scale factor that characterized the optional reduction.

In the above discussion, the histogram of character spacing was developed over the whole image, either at full resolution (no reduction), or at reduced resolution. It is also possible to gather the spacing statistics over a portion of the image at a particular resolution, or on parts of the image at one resolution and other parts at a different resolution. If after reduction the first histogram peak is relatively small in area, it may be that all the characters were initially close together at full resolution and that the reduction caused them to merge together. In this case, the first peak may even be smaller than the second. If only one peak is observed, this means that all the characters have merged, and the peak corresponds to the interword distance, or that the image is an anomalous one that has only one word per line.

The histogram obtained as described above may also be used to determine text line bounding boxes. In particular, the embodiment of FIG. 19A could be modified to merge neighboring bounding boxes (presumed to be character boxes) so long as the spacing was not significantly greater than the peak location that corresponds to the interword spacing. This prevents merging columns of text. In the event that the image was segmented into text blocks, it even suffices to merge all the boxes in a given text line since the problem of not merging across column gaps does not exist. Similarly, the embodiment of FIG. 19B could be modified to choose a horizontal SE that is somewhat larger than the peak location that corresponds to the interword spacing.

Experimental Results

For our experiments, we used images of text scanned at 300 dpi. The training data consisted of approximately 2100 tokens, in eight fonts, including serif and sans-serif. No bold or italic fonts were included. The data included isolated characters, nonsense words, as well as words from a text passage. Training was performed using five iterations of Baum-Welch over the entire training corpus.

The test images consisted of scanned pages of the Table of Contents from five journals or conference proceedings. As discussed above, the spotter can be directed to find variants of a word, such as lead-case and pluralization, by providing the variants as alternate keywords. We ran the spotter in this mode, spotting for the following groups of words in our test images: (Computer Computers computer computers) (Hidden hidden) (IEEE) (Identification identification) (Image Images image images) (Markov) (Models Model models model) (Parallel parallel) (Quantization quantization) (Quantizer Quantizers quantizer quantizers) (Recognition recognition) (Recognizer Recognizers recognizer recognizers) (Society society) (Speaker Speakers speaker speakers) (Speech speech) (Synthesis synthesis) (Synthesizer Synthesizers synthesizer synthesizers) (Synthetic synthetic) (System Systems system systems) (Vector vector) (Verification verification) (Vision vision) (1985) (1990) and (1992). There were a total of about 160 keywords in the five Table of Contents.

Although we used a range of structuring elements, for some small fonts, the boxer may merge some of the words in a line. In our test set there were three such errors in the keywords, and these were not included in the detection rate computations. However such errors could be handled by spotting for words in lines of text.

Testing was performed using the forward algorithm, as described above, one group of keywords was spotted at a time. A keyword was considered to be correctly spotted if it was identified as any of the variants in the word group containing the keyword. A false alarm was considered to have occurred when a bounding box containing a non-keyword was identified as any keyword in the current keyword group.

The keyword detection rate was computed as the number of keywords correctly spotted, relative to the total number of keywords. The false alarm rate was computed as the number of times a non-keyword bounding box was identified as a keyword, relative to the total number of non-keyword bounding boxes tested in the runs.

We evaluated the system performance by comparing the rate at which keywords were correctly identified, P(D), and the rate at which non-keyword boxes were incorrectly identified as any keyword, P(F). The threshold, T was varied to sweep out a range of detection vs false alarm rates. A typical performance had a keyword detection rate on the order of 95–96% with an accompanying false alarm rate of about 0.2%.

FIGS. 20A–20D show a representative input image, as operated on by the word boxer using different SEs. The figures show the image generally at fully size (actually shrunk slightly from an original text width of 17.5 cm). This shrinking is distinct from and unrelated to the thresholded reduction carried out in the boxing operation. The large rectangle is merely a frame around the processed image and is not part of the original or processed image.

Figures 20A, 20B:
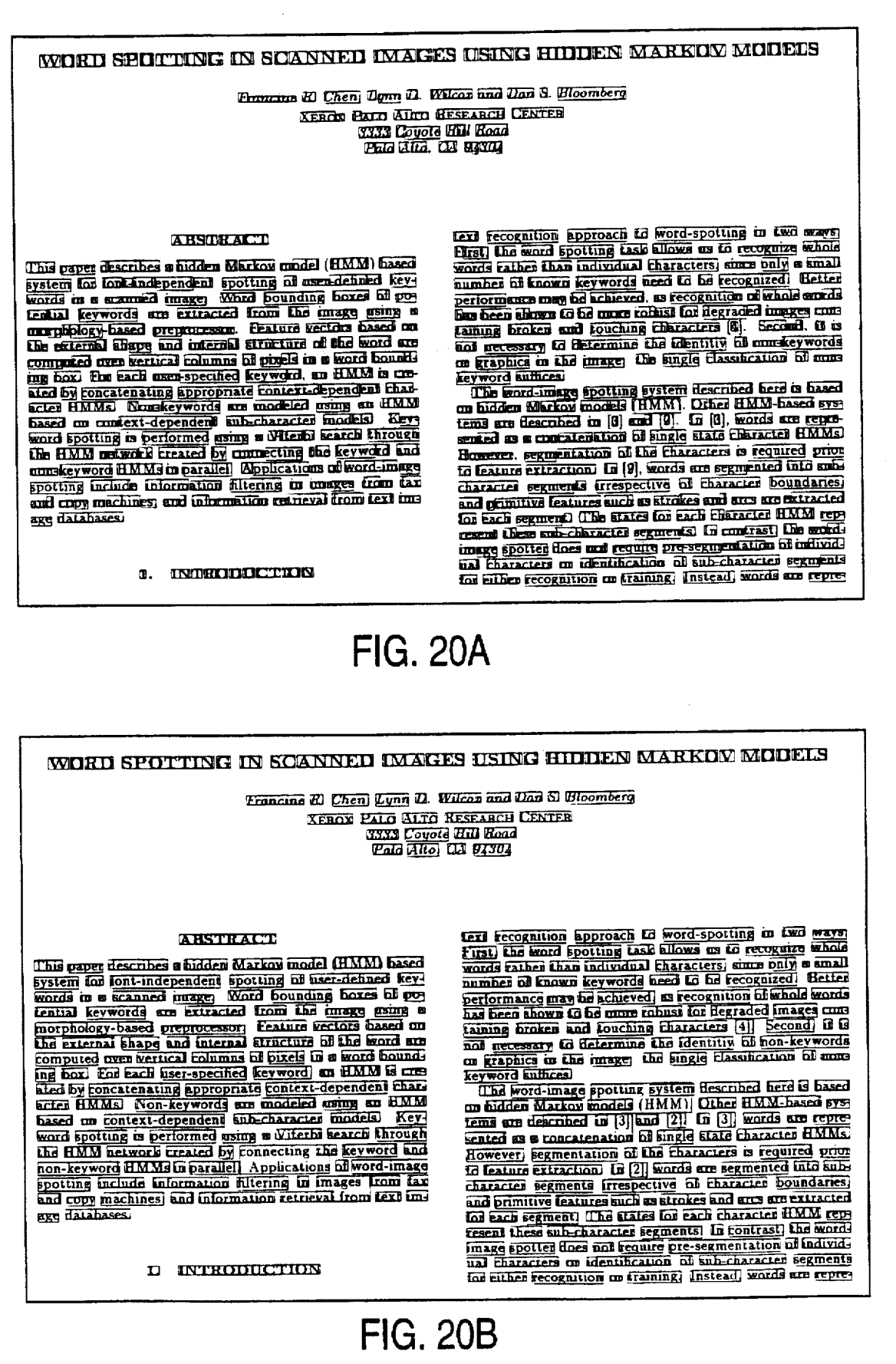

FIG. 20A shows the word boxes that result from closing the 2× reduced image with the (2.5) SE pair, namely a vertical close with a 2×1 SE and a horizontal close with a 1×5 SE. This SE pair is generally too small since it fails to box a number of words in the small-font body text, and generally fails to box words in the larger-font title.

FIG. 20B shows the word boxes that result from closing the 2× reduced image with the (3.5) SE pair. This SE pair works somewhat better in boxing the body text, but the larger vertical SE occasionally merges vertically adjacent words.

Figures 20C, 20D:
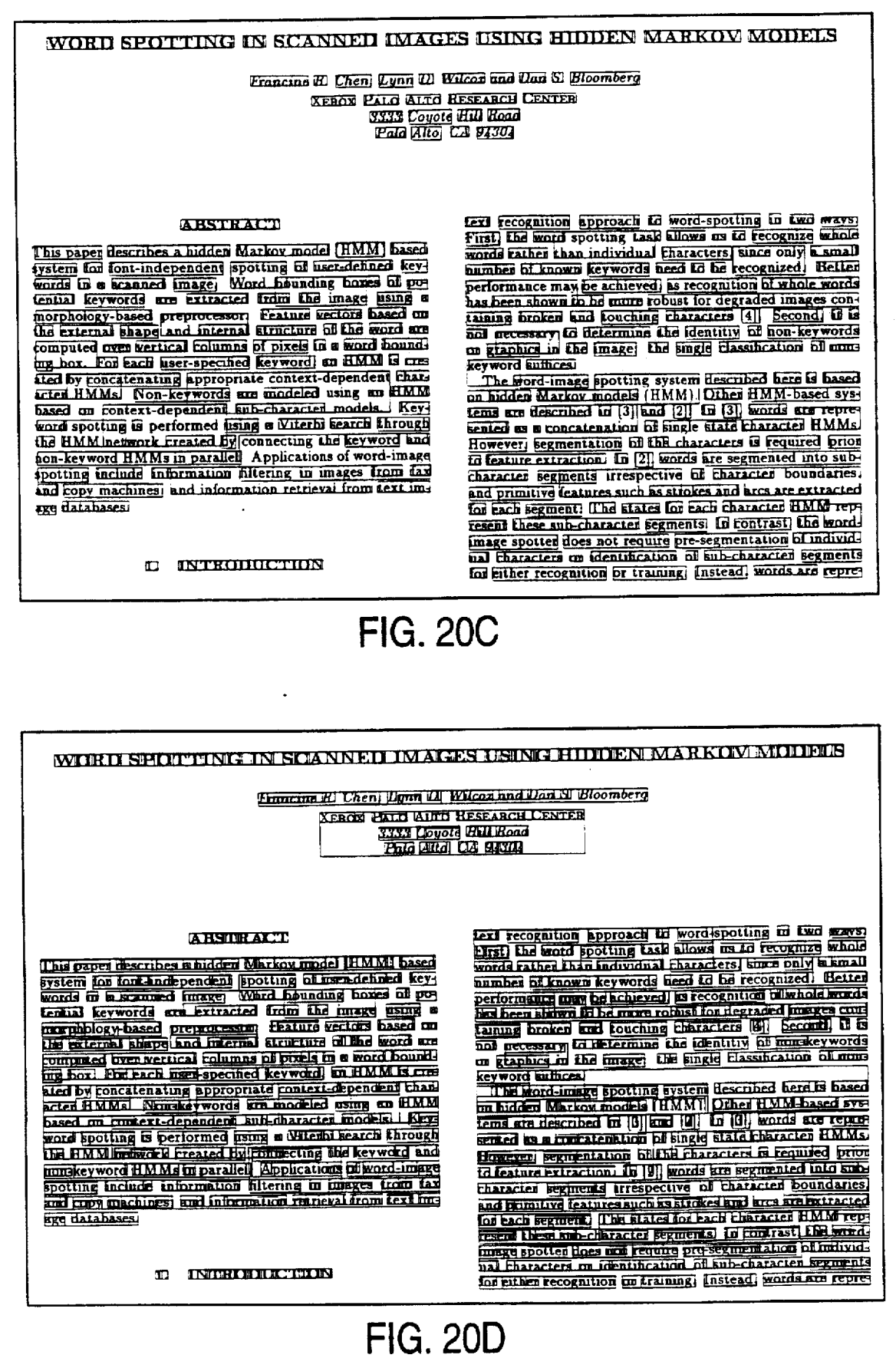

FIG. 20C shows the word boxes that result from closing the 2× reduced image with the (4,8) SE pair. This SE pair causes multiple words to merge together in the body text, but does a good job of boxing the words in the title.

FIG. 20D shows the union of the sets of bounding boxes provided by the plurality of SE pairs. As can be seen, there is usually one SE pair that correctly boxes a word when other SE pairs have failed.

Figures 21A, 21B:
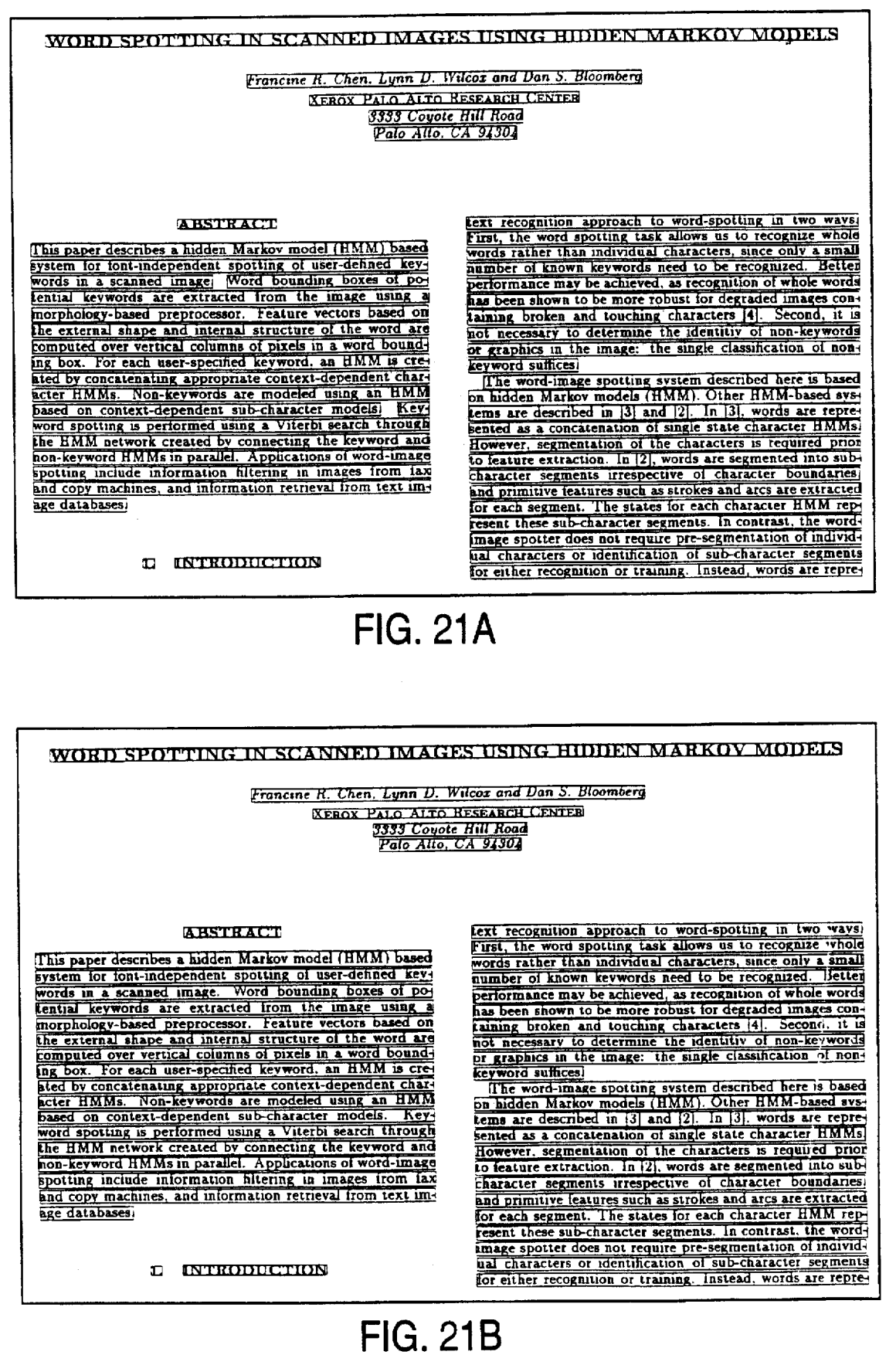

FIGS. 21A and 21B show the text line boxes that result from closing the 2× reduced image with the (2,20) and (2,25) SE pairs, respectively. The (2.20) SE pair occasionally failed to box a complete text line, while there were no errors with the (2.25) SE pair.

Applications

In each of the following applications, the word image spotter allows identification of the location of keywords specified by a user. Thus keyword-based applications can be developed which do not require OCR of the full image to be performed, and in which ASCII keywords need not be stored with the image. This is especially useful when the image of text will be used once to determine the presence of a keyword, and then discarded if the keyword is not found.

One application of word-image spotting is in the area of information filtering, where interesting portions of a text, or text containing items of interest, are identified and processed. For example, given a book or lengthy report, it is often preferable to identify the portions of interest. Word-image spotting could be incorporated in a copier to provide this capability. A user could type in the set for keywords of interest. The copier could then be programmed to produce output based on the occurrence of these keywords. For example, the copier could reproduce only those pages (or paragraphs) containing the keywords, or could highlight the keywords or the paragraphs in which the keywords are found. Another possibility is that the occurrence of certain keyword phrases could be used to set warning flags on the copiers, such as the keyword phrases "Private Data", or "Protected by copyright law". These techniques could also be used in facsimile machines, for example to notify a user when a fax document contained words such as "urgent" or "rush".

The word-image spotter also has applications in information retrieval from scanned images of documents. Here, a user-specified set of keywords is used to describe the documents of interest. After retrieval of the highest ranked documents, the user can then revise the set of keywords.

Discussion of the Software

A current embodiment of the invention is implemented in software on a digital computer. Appendix 1 (®1992, Unpublished Work, Xerox Corporation) provides a source code program for implementation of this embodiment. The program is in the C and perl languages, well-known to those of skill in the art. The program has been demonstrated on a Sun Workstation, although it will be apparent to those of skill in the art that a wide variety of programming languages and hardware configurations could readily be used based on this disclosure without departing from the scope of the invention.

Conclusion

In conclusion it can be seen that the present invention and its associated technologies provide robust and effective techniques for modeling user defined keywords, locating word and text line bounding boxes in a scanned image, and spotting the keywords in the image. While the above is a complete description of the preferred embodiments of the present invention, various modifications, alternative constructions, and equivalents can be used.

For example, an alternative method for identification of lines of text is to first identify columns, and then produce computer histograms of black pixels across each column. Peaks in the histograms correspond to lines of text. Additionally, an alternative to using the upper and lower word contours as separate features is to use their difference as a single feature. Thus, at each pixel column, the difference between the upper and lower word contour values is computed and then used as a single feature describing the character shape. Although information is lost in using a single feature, an advantage is that the feature is independent of the presence and height of ascenders and descenders in the word.

Therefore, the above description and illustration should not be taken as limiting the scope of the invention which is defined by the claims.

REFERENCES

1. D. S. Bloomberg, "Multiresolution Morphological Approach to Document Image Analysis", *Proceedings of the Int. Conf. on Document Analysis and Recognition*, Saint-Malo, France, Sept. 1991, pp. 963–971.

2. C. B. Bose, and S. Kuo, "Connected and Degraded Text Recognition Using Hidden Markov Model", *Proceedings of the Int. Conf. on Pattern Recognition*, Netherlands, Sept. 1992, pp. 116–119.

3. Y. He, M. Y. Chen, and A. Kundu, "Handwritten Word Recognition Using HMM with Adaptive Length Viterbi Algorithm", *Proceedings of the Int. Conf. on Acoustics, Speech and Signal Processing*, San Francisco, Calif., March 1992, Vol. 3, pp. 153–156.

4. T. K. Ho, J. J. Hull, and S. N. Srihari, "A Word Shape Analysis Approach to Recognition of Degraded Word Images," *Proceedings of the USPS Advanced Technology Conference*, Nov. 1990, pp. 217–231.

5. S. Kahan, T. Pavlidis, and H. S. Baird, "On the Recognition of Printed Characters of Any Font and Size", *IEEE Trans. Pattern Analysis and Machine Intelligence*, Vol. 9, No. 2, March 1987, pp. 274–288.

6. D. B. Paul and E. A. Martin, "Speaker Stress-Resistant Continuous Speech Recognition," *Proceedings of the Int. Conf. on Acoustics, Speech and Signal Processing*, 1988, pp. 283–286.

7. L. R. Rabiner, "A Tutorial on Hidden Markov Models and Selected Applications in Speech Recognition", *Proc. IEEE*, Vol. 77, No. 2, February 1989, pp. 257–285.

What is claimed is:

1. A processor-based method of determining whether a keyword made up of characters is present in a bitmap input image containing words in lines of text, the words and lines of text being considered to extend horizontally, the method comprising the steps of:

provided a set of previously-trained single-character hidden Markov models (HMMs), each single-character HMM having a number of possible contexts, depending on whether the character has an ascender or a descender;

concatenating those single-character HMMs that correspond to the characters in the keyword so as to create a keyword HMM, the context of a given single-character HMM used to create the keyword HMM being determined on the basis of whether the keyword contains characters having ascenders or a descenders;

constructing an HMM network that includes a first path passing through the keyword HMM and a second path that does not pass through the keyword HMM;

locating a portion of the input image potentially containing a line of text;

providing an array of pixel values, referred to as a potential text line, representing the portion of the input image;

horizontally sampling the potential text line to provide a plurality of segments wherein each segment extends the entire height of the potential text line and the sampling to provide segments is performed in a manner that is independent of the values of the pixels in the potential textline;

for each segment, generating at least one feature that depends on the values of the pixels in the segment, thereby providing a set of features based on the potential text line, the set of features providing shape information regarding words in the line of text potentially contained in the portion of the input image;

applying the set of features to the HMM network;

finding a path through the network that maximizes the probability of the set of features as applied to the network; and determining whether the path that maximizes the probability passes through the keyword HMM so as to provide an indication whether the portion of the input image contains the keyword.

2. The method of claim 1 wherein:

each character on which one of the set of single-character HMMs is based has a number of distinct portions;

each character has a shape that is characterized by a number of feature vectors, at a corresponding number of horizontal locations along the character;

a given single-character HMM for a given character is characterized by a number of states, each state of which corresponds to one of the number of distinct portions of the given character; and each state is characterized by a Gaussian distribution with mean vector and covariance matrix of the feature vectors that characterize the corresponding distinct portion of the given character.

3. The method of claim 1 wherein the step of locating includes performing at least one reduction operation on the input image.

4. The method of claim 1 wherein the step of locating includes performing at least one morphological operation on a representation of the input image.

5. The method of claim 1 wherein:

substantially all the segments have the same width;

the set of features for the potential text line includes a plurality of feature vectors, each feature vector corresponding to a respective one of the segments; and a given feature vector for a given segment represents pixel values of the given segment.

6. The method of claim 5 wherein a feature vector for a given segment of the potential text line includes a representation of the topmost pixel in the given segment having a value above a threshold, a representation of the bottommost pixel in the given segment having a value above the threshold, and a representation of pixel values between the topmost pixel having a value above the threshold and the bottommost pixel having a value above the threshold.

7. The method of claim 6 wherein the representation of pixel values includes a set of autocorrelation values.

8. The method of claim 6 wherein the representation of pixel values includes the number of pixel transitions through a threshold value.

9. The method of claim 1 wherein the step of providing an array of pixel values includes proportionally scaling the height and width of the portion of the input image to provide a potential text line with a height having a predefined number of pixels.

10. The method of claim 1 wherein the single-character HMMs were trained on a corpus containing bitmap images of text in a plurality of fonts.

11. The method of claim 1 wherein:

the keyword HMM is referred to below as the first keyword HMM; and the method further comprises the stop of concatenating those single-character HMMs that correspond to the characters in the keyword to create a second keyword HMM, the context of a given single-character HMM used to create the second keyword HMM-being a context different from the context of the given single-character HMM used to create the first keyword HMM; and the HMM network-includes a third path passing through the second keyword HMM but not through the first keyword HMM.

12. The method of claim 1 wherein:

the keyword includes only characters having neither ascenders nor descenders;

the keyword HMM, referred to below as the first keyword HMM consists only of single-character HMMs having the context of neither ascenders nor descenders;

the method further includes the steps of concatenating those single-character HMMs that correspond to the characters in the keyword to create second, third, and fourth keyword HMMs;

the second keyword HMM consists only of single-character HMMs having the context of ascenders only;

the third keyword HMM consists only of single-character HMMs having the context of descenders only;

the fourth keyword HMM consists only of single-character HMMs having the context of both ascenders and descenders;

the HMM network includes first, second, third, and fourth text line HMM components connected in parallel; and each of the first, second, third, and fourth text line HMM components includes a respective one of the first keyword HMM, the second keyword HMM, the third keyword HMM, and the fourth keyword HMM.

13. The method of claim 1 wherein:

the keyword includes characters having ascenders but no characters having descenders;

the keyword HMM referred to below as the first keyword HMM, consists only of single-character HMMs having the context of ascenders only;

the method further includes the steps of concatenating those single-character HMMs that correspond to the characters in the keyword to create a second keyword HMM;

the second keyword HMM consists only of single-character HMMs having the context of both ascenders and descenders;

the HMM network includes first and second text line HMM components connected in parallel;

the first text line HMM component includes the first keyword HMM; and the second text line HMM component includes the second keyword HMM.

14. The method of claim 1 wherein the HMM network includes a the keyword HMM, a non-keyword HMM, and an interword space state.

15. The method of claim 1 wherein:

the keyword is multi-word phrase; and the concatenating step includes concatenating single-character HMMs for the words in the multi-word phrase to provide a set of single-word HMMs and concatenating the single-word HMMs with at least one interword space state.

16. A processor-based method of determining whether a keyword made up of characters is present in a bitmap input image containing words in lines of text, the words and lines of text being considered to extend horizontally, the method comprising the steps of:

providing a set of previously trained single-character HMMs;

concatenating those single-character HMMs that correspond to the characters in the keyword so as to create a keyword HMM, providing a non-keyword HMM;

constructing an HMM network that includes a first path passing through the keyword HMM and a second path passing through the non-keyword HMM but not passing through the keyword HMM;

locating a portion of the input image potentially containing a line of text;

providing an array of pixel values, referred to as a potential text line, representing the portion of the input image;

generating a set of features based on the potential text line, the set of features providing shape information regarding the words in the line of text potentially contained in the portion of the input image;

the set of features being generated at a plurality of uniformly spaced horizontal locations, thereby avoiding segmentation of the potential text line in a manner that depends on values of the pixels in the potential text line;

applying the set of features to the HMM network;

finding a path through the network that maximizes the probability of the set of features as applied to the network; and determining whether the path that maximizes the probability passes through the keyword HMM so as to provide an indication whether the portion of the input image contains the keyword.

17. The method of claim 16 wherein:

each character has a plurality of distinct portions;

each character has a shape that is characterized by a number of feature vectors at a corresponding number of horizontal locations along the character;

a given single-character HMM for a given character is characterized by a plurality of states, each state of which corresponds to one of the number of distinct portions of the given character; and each state is characterized by a Gaussian distribution with mean vector and covariance matrix of the feature vectors that characterize the corresponding distinct portion of the given character.

18. The method of claim 16 wherein the step of locating includes performing at least one reduction operation on the input image.

19. The method of claim 16 wherein the step of locating includes performing at least one morphological operation on a representation of the input image.

20. The method of claim 16 wherein the set of features for the potential text line includes a plurality of multi-parameter feature vectors determined at respective ones of the plurality of uniformly spaced horizontal locations in the potential text line, a given feature vector for a given horizontal location representing pixel values at the given horizontal location.

21. The method of claim 20 wherein a feature vector for a given horizontal location in the potential text line includes a representation of the topmost pixel at the given horizontal location having a value above a threshold, a representation of the bottommost pixel at the given horizontal location having a value above the threshold, and a representation of pixel values between the topmost pixel having a value above the threshold and the bottommost pixel having a value above the threshold.

22. The method of claim 10 wherein the representation of pixel values includes a set of autocorrelation values.

23. The method of claim 10 wherein the representation of pixel values includes the number of pixel transitions through a threshold value.

24. The method of claim 16 wherein the single-character HMMs were trained on a corpus containing bitmap images of text in a plurality of fonts.

25. The method of claim 16 wherein:

each single-character HMM has a number of possible contexts, depending on whether the character has an ascender or a descender; and the context of a given single-character HMM used to create the keyword HMM is determined on the basis of whether the keyword contains characters having ascenders or a descenders.

26. The method of claim 16 wherein the HMM network includes a the keyword HMM, a non-keyword HMM, and an interword space state.

27. The method of claim 16 wherein:

the keyword is multi-word phrase; and the concatenating step includes concatenating single-character HMMs for the words in the multi-word phrase to provide a set of single-word HMMs and concatenating the single-word HMMs with at least one interword space state.

28. The method of claim 16 wherein the step of locating includes constructing bounding boxes, at least some of which enclose respective lines of text in the input image, the bounding boxes being considered to extend horizontally.

29. The method of claim 16 wherein the step of providing an array of pixel values includes proportionally scaling the height and width of the portion of the input image to provide a potential text line with a height having a predefined number of pixels.

30. The method of claim 16 wherein the set of features further provides information regarding word internal structure.

31. A processor-based method of determining whether a keyword made up of characters is present in a bitmap input image containing words in lines of text, the words and lines of text being considered to extend horizontally, the method comprising the steps of:

providing a set of previously trained single-character hidden Markov models (HMMS) wherein each character on which one of the set of single-character HMMs is based has a number of distinct portions, each character has a shape that is characterized by feature vectors at corresponding horizontal locations along the character, a given single-character HMM for a given character is characterized by a number of states, each state of which corresponds to one of the number of distinct portions of the given character, and each state is characterized by a probability distribution of the feature vectors that characterize the corresponding distinct portion of the given character;

concatenating those single-character HMMs that correspond to the characters in the keyword so as to create a keyword HMM;

providing a non-keyword HMM;

constructing a network that includes a first path passing through the keyword HMM and a second path passing through the non-keyword HMM but not passing through the keyword HMM;

locating a portion of the input image potentially containing a line of text;

providing an array of pixel values, referred to as a potential text line, representing the portion of the input image, the potential text line having a plurality of vertically extending columns of pixels at respective ones of a plurality of uniformly spaced horizontal locations;

generating a plurality of feature vectors determined at respective ones of the plurality of horizontal locations in the potential text line, a given feature vector for a given horizontal location being specified by pixel values in the column at the given horizontal location;

the plurality of feature vectors together representing word shape while being generated by uniform segmentation of the potential text line, whereby segmentation of a type that depends on values of the pixels in the potential text line is avoided;

applying the plurality of feature vectors to the HMM network;

finding a path through the network that maximizes the probability of the plurality of feature vectors as applied to the network; and determining whether the path that maximizes the probability passes through the keyboard HMM, so as to provide an indication whether the potential text line is the keyword.

32. The method of claim 31 wherein the step of locating includes performing at least one reduction operation on the input image.

33. The method of claim 31 wherein the step of locating includes performing at least one morphological operation on a representation of the input image.

34. The method of claim 31 wherein the step of locating comprises:

performing at least one reduction operation on the input image; and performing at least one morphological operation on the input image, so reduced.

35. The method of claim 31 wherein a feature vector for a given horizontal location in the potential text line includes a representation of the topmost pixel at the given horizontal location having a value above a threshold and a representation of the bottommost pixel at the given horizontal location having a value above the threshold.

36. The method of claim 31 wherein the step of locating includes constructing bounding boxes, at least some of which enclose respective words in the input image, the bounding boxes being considered to extend horizontally.

37. The method of claim 36 wherein at least some of the bounding boxes enclose respective portions of words in the input image.

38. The method of claim 31 wherein a feature vector for a given horizontal location includes a representation of the topmost pixel at the given horizontal location having a value above a threshold, a representation of the bottommost pixel at the given horizontal location having a value above the threshold, and a representation of pixel values between the topmost pixel having a value above the threshold and the bottommost pixel having a value above the threshold.

39. The method of claim 38 wherein the representation of pixel values includes a set of autocorrelation values.

40. The method of claim 38 wherein the representation of pixel values includes the number of pixel transitions.

41. The method of claim 31 wherein the step of providing an array of pixel values includes proportionally scaling the height and width of the portion of the input image to provide a potential text line with a height having a predefined number of pixels.

42. The method of claim 31 wherein each feature vector contains a plurality of parameters.

43. The method of claim 31 wherein the single-character HMMs were trained on a corpus containing bitmap images of text in a plurality of fonts.

44. The method of claim 31 wherein:

each single-character HMM has a number of possible contexts, depending on whether the character has an ascender or a descender; and the context of a given single-character HMM used to create the keyword HMM is determined on the basis of whether the keyword contains characters having ascenders or a descenders.

45. The method of claim 31 wherein the HMM network includes a the keyword HMM, a non-keyword HMM, and an interword space state.

46. The method of claim 31 wherein:

the keyword is multi-word phrase; and the concatenating step includes concatenating single-character HMMs for the words in the multi-word phrase to provide a set of single-word HMMs and concatenating the single-word HMMs with at least one interword space state.

* * * * *